(12) United States Patent
Kupiszewski et al.

(10) Patent No.: US 11,962,188 B2
(45) Date of Patent: Apr. 16, 2024

(54) ELECTRIC MACHINE

(71) Applicant: General Electric Company, Schenectady, NY (US)

(72) Inventors: Thomas Kupiszewski, Liberty Township, OH (US); Anil Kumar Tolpadi, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 499 days.

(21) Appl. No.: 17/154,121

(22) Filed: Jan. 21, 2021

(65) Prior Publication Data

US 2022/0231551 A1 Jul. 21, 2022

(51) Int. Cl.
*H02K 1/20* (2006.01)
*B64D 27/24* (2006.01)
*B64D 33/08* (2006.01)
*H02K 9/19* (2006.01)
*H02K 11/25* (2016.01)

(52) U.S. Cl.
CPC ............... *H02K 1/20* (2013.01); *B64D 27/24* (2013.01); *B64D 33/08* (2013.01); *H02K 9/19* (2013.01); *H02K 11/25* (2016.01)

(58) Field of Classification Search
CPC . H02K 1/20; H02K 9/19; H02K 11/25; H02K 9/197; B64D 27/24; B64D 33/08
USPC .......................... 310/52, 54, 58, 59, 89, 400
See application file for complete search history.

(56) References Cited

U.S. PATENT DOCUMENTS

| 3,797,239 A | 3/1974 | Hausmann et al. |
| 4,208,597 A | 6/1980 | Mulach et al. |
| 4,352,034 A | 9/1982 | Karhan et al. |
| 4,966,523 A | 10/1990 | Sherikar |
| 5,337,568 A | 8/1994 | Lee et al. |
| 5,731,643 A | 3/1998 | Avakian et al. |
| 5,983,985 A | 11/1999 | Counterman et al. |
| 6,098,402 A | 8/2000 | Sawruk |
| 6,142,734 A | 11/2000 | Lee |

(Continued)

FOREIGN PATENT DOCUMENTS

| CN | 208257523 U | * 12/2018 | |
| DE | 102015214053 A1 | * 1/2017 | ............. H02K 11/33 |
| EP | 2463991 A2 | * 6/2012 | ............... H02K 1/20 |

OTHER PUBLICATIONS

DE102018208368 A1 (Year: 2019).*

(Continued)

*Primary Examiner* — Jose A Gonzalez Quinones

(74) *Attorney, Agent, or Firm* — Dority & Manning, P.A.

(57) ABSTRACT

An electric machine is provided herein that includes a stator assembly. The stator assembly includes a stator core having one or more lamination packages. The stator core can define an outer ring and a plurality of teeth extending from the outer ring. A cooling plate may be positioned adjacent to at least one of the one or more lamination packages. The cooling plate can define one or more channels therethrough. One or more windings can be arranged around one or more of the plurality of teeth of the stator core. A rotor can be operably coupled with the stator assembly. A cooling system can be fluidly coupled with the one or more channels of the cooling plate. The cooling system provides a cryogenic fluid through the one or more channels to cool the electric machine.

19 Claims, 12 Drawing Sheets

(56) References Cited

U.S. PATENT DOCUMENTS

| | | | |
|---|---|---|---|
| 6,504,274 B2 | 1/2003 | Bunker et al. | |
| 6,582,584 B2 | 6/2003 | Lee et al. | |
| 6,589,600 B1 | 7/2003 | Hasz et al. | |
| 6,644,921 B2 | 11/2003 | Bunker et al. | |
| 6,982,506 B1 | 1/2006 | Johnsen | |
| 7,766,615 B2 | 8/2010 | Spangler et al. | |
| 8,083,485 B2 | 12/2011 | Chon et al. | |
| 8,210,812 B2 | 7/2012 | Abdel-Messeh et al. | |
| 8,558,425 B2 | 10/2013 | Stahlhut et al. | |
| 8,770,232 B2 | 7/2014 | Onodera et al. | |
| 8,894,367 B2 | 11/2014 | Lee et al. | |
| 9,334,755 B2 | 5/2016 | Riley et al. | |
| 9,388,700 B2 | 7/2016 | Propheter-Hinckley et al. | |
| 9,467,023 B2 | 10/2016 | Pal | |
| 9,551,229 B2 | 1/2017 | Rodriguez et al. | |
| 9,574,449 B2 | 2/2017 | Eifel et al. | |
| 9,835,088 B2 | 12/2017 | Shchukin et al. | |
| 9,882,455 B2 | 1/2018 | Danov et al. | |
| 2004/0066099 A1* | 4/2004 | Weeber | H02K 55/04 310/58 |
| 2011/0036067 A1* | 2/2011 | Rupp | F02C 7/042 60/226.1 |
| 2013/0169080 A1* | 7/2013 | Salamah | H02K 9/227 310/59 |
| 2015/0122378 A1* | 5/2015 | Palm | H01B 1/023 148/438 |
| 2015/0280526 A1* | 10/2015 | Chamberlin | H02K 3/24 310/54 |
| 2017/0214294 A1 | 7/2017 | Menon et al. | |
| 2017/0240271 A1 | 8/2017 | Fasel | |
| 2018/0138767 A1* | 5/2018 | Moore | B64D 27/18 |
| 2018/0205299 A1 | 7/2018 | Huang et al. | |
| 2021/0135516 A1* | 5/2021 | Page | H02K 5/203 |

OTHER PUBLICATIONS

CN 109617272 A (Year: 2019).*
WO 2016124523 A1 (Year: 2016).*
EHS Cryogenic Liquids Use—University of Michigan-Dearborn (Year: 2023).*
EHS Cryogenic Liquids Safety—OSU (Year: 2015).*
EHS Cryogenic Liquids—West Virginia University (Year: no date).*

* cited by examiner

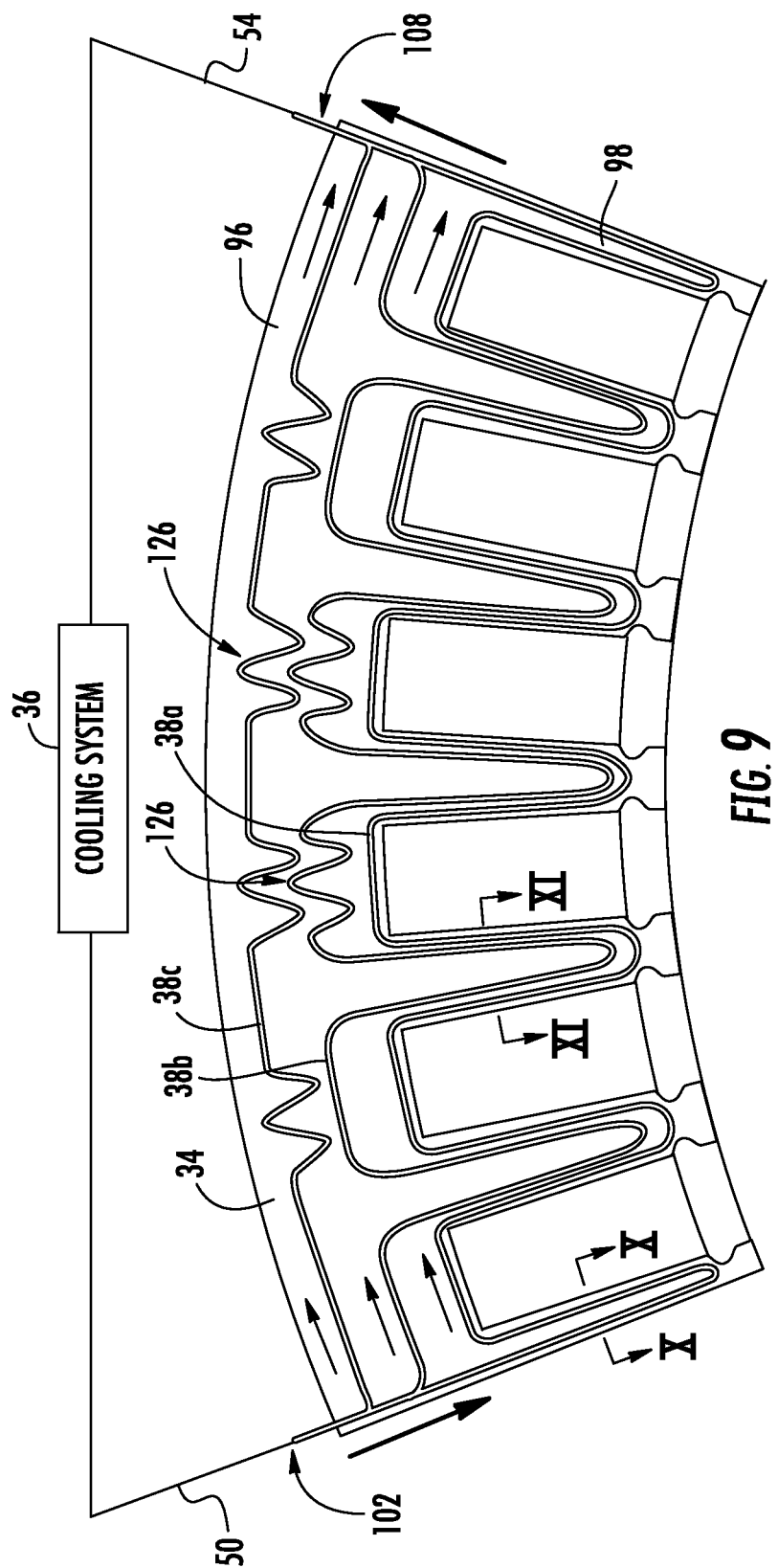

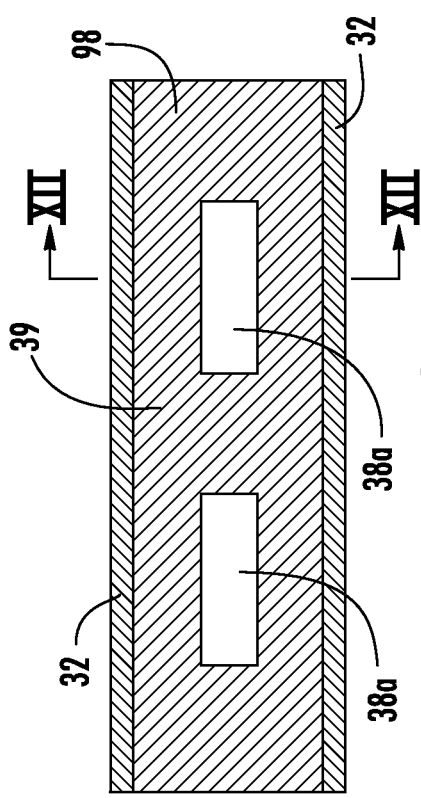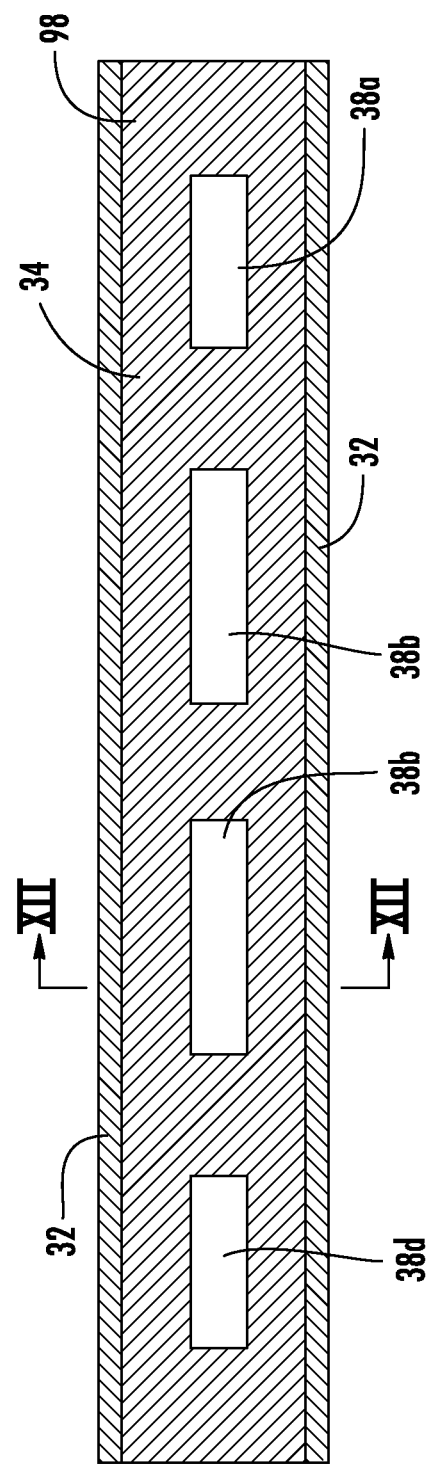

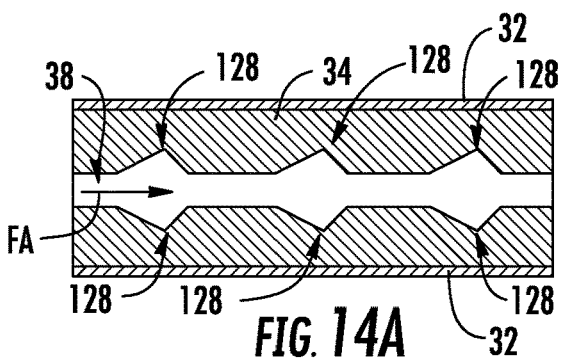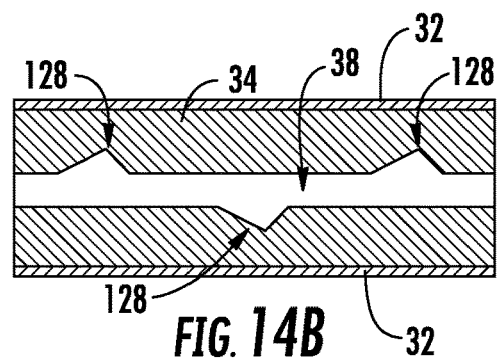
FIG. 14A        FIG. 14B
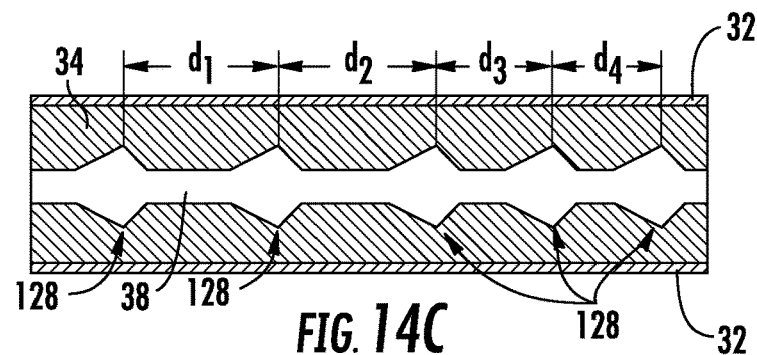
FIG. 14C
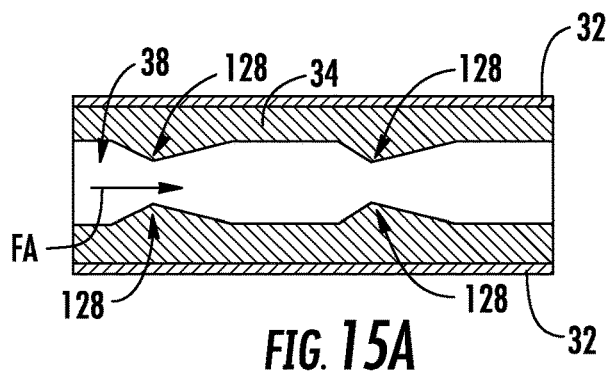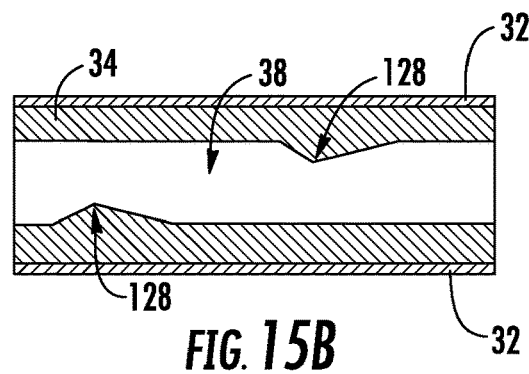
FIG. 15A        FIG. 15B
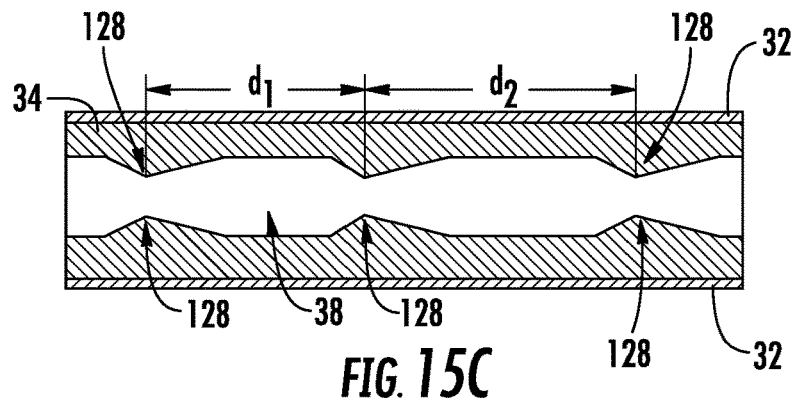
FIG. 15C

US 11,962,188 B2

ELECTRIC MACHINE

FIELD

The present subject matter relates generally to an electric machine having a cooling system, and to an aircraft incorporating the electric machine having the cooling system.

BACKGROUND

Typical aircraft propulsion systems include one or more gas turbine engines. For certain propulsion systems, the gas turbine engines generally include a fan and a core arranged in flow communication with one another. Additionally, the core of the gas turbine engine general includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to the atmosphere.

Moreover, for at least certain propulsion systems, it may be beneficial to include electric generators operable with the engine to extract energy and provide such energy to various other systems of the aircraft including the propulsion system. During operation of the electric machine in conjunction with the propulsion system, the electric machine may undesirably generate heat. Moreover, as the speed of the aircraft increases, the amount of heat generation may also increase. Accordingly, a system for rejecting heat from an electric machine to increase the efficiency of the electric machine would be useful.

BRIEF DESCRIPTION

Aspects and advantages of the invention will be set forth in part in the following description, or may be obvious from the description, or may be learned through practice of the invention.

In some embodiments of the present disclosure, an electric machine has a stator assembly. The stator assembly includes a stator core including one or more lamination packages. The stator core defines an outer ring and a plurality of teeth extending from the outer ring. A cooling plate is positioned adjacent to at least one of the plurality of lamination packages. The cooling plate defines one or more channels therethrough. One or more windings is arranged around one or more teeth of the stator core. A rotor is operably coupled with the stator assembly. A cooling system is fluidly coupled with the one or more channels of the cooling plate. The cooling system provides a cryogenic fluid through the one or more channels.

In some embodiments of the present disclosure, an electric machine for an engine includes a stator assembly. The stator assembly includes a stator core including one or more lamination packages, one or more teeth, and an externally-overcoated cooling plate defining one or more internal cooling flow channels. Each lamination package includes at least one lamination and at least one foil. The cooling plate separates a first lamination package and a second lamination package of the one or more lamination packages. One or more is windings arranged around the one or more teeth of the stator core. A rotor is operably coupled with the stator assembly. A cooling system is fluidly coupled with the one or more channels of the cooling plate and provides a fluid along a flow axis of the one or more channels. The one or more channels defines at least one dimple extending outwardly from the fluid flow axis.

In some embodiments of the present disclosure, a method of manufacturing an electric machine for an engine is provided. The electric machine comprising a rotor, a stator assembly, and a cooling system. The method includes receiving a lamination package that includes at least one lamination and at least one foil, the foil at least partially containing dysprosium. The method further includes receiving an externally-overcoated cooling plate having one or more internal cooling flow channels. The method also include aligning the lamination package and the cooling plate along a common axis. The method additionally includes fluidly coupling a cooling system to the one or more channels of the cooling plate.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 9 is a cross-sectional view of the cooling plate taken along the line VI-VI of FIG. 2 in accordance with various aspects of the present disclosure;

FIG. 10 is a cross-sectional view of the cooling plate taken along the line X-X of FIG. 9;

FIG. 11 is a cross-sectional view of the cooling plate taken along the line XI-XI of FIG. 9;

FIGS. 14A-14C are various cross-sectional views of a channel of the cooling plate taken along the line XII-XII of FIGS. 10 and 11 in accordance with various aspects of the present disclosure;

FIGS. 15A-15C are various cross-sectional views of a channel of the cooling plate taken along the line XII-XII of FIGS. 10 and 11 in accordance with various aspects of the present disclosure;

DETAILED DESCRIPTION

Figure 1:
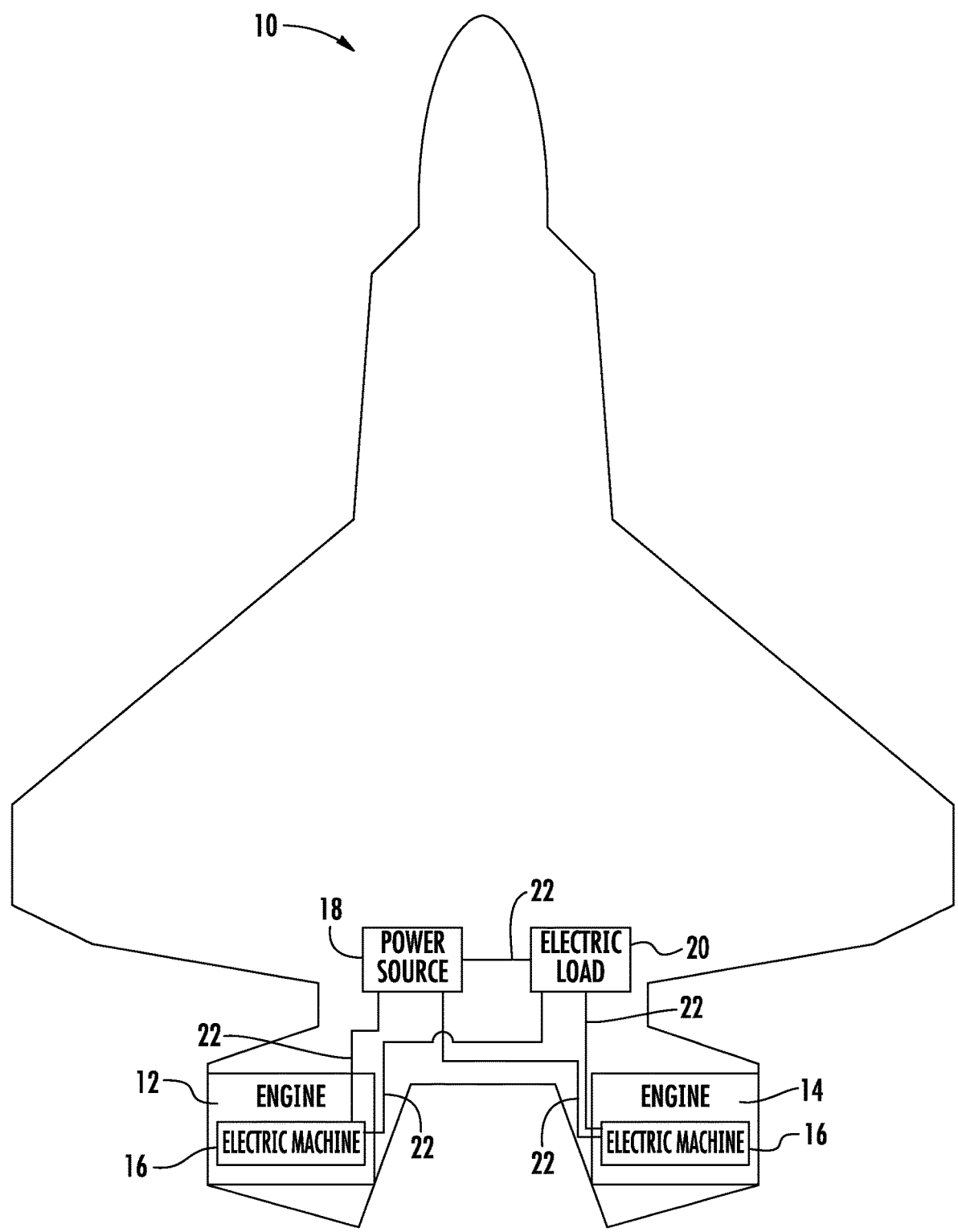
FIG. 1 is a schematic view of an aircraft and power system architecture of an aircraft having an electric machine operably coupled with each engine of the aircraft in accordance with various aspects of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", "generally", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

Generally, the present disclosure provides for an electric machine that includes a rotor rotatable relative to a stator assembly. The technology of the present disclosure will be described with relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

The stator assembly may be formed from one or more lamination packages and one or more cooling plates between the lamination packages. The one or more cooling plates may define one or more channels. A cooling system may be operably coupled with the one or more channels. During use of the electric machine, the cooling system may regulate a fluid through the one or more channels for rejecting heat from the electric machine.

In some examples, the electric machine may be implemented on a vehicle that is capable of traveling at speeds reaching or exceeding transonic speeds, which may be defined as speeds near, at, or faster than the speed of sound (e.g., 343 meters per second). While operating at such speeds, the electric machine may generate unwanted heat. Some of the generated heat may be rejected by the fluid within the one or more channels and the cooling system.

In some embodiments, one or more laminations of a first material and one or more foils of a second material may be interspersed within a lamination package. As used herein, "foil" and "foils" can be used interchangeably and neither indicate a required number of foil that are included in the respective description. The foil may be formed from, or include, a rare earth metal, which may be in the lanthanide series. For instance, the foil may be formed from or contain dysprosium, which may have one of the largest magnetizations. When the foil is cooled, the power density of the electric machine may be increased. For instance, by maintaining a dysprosium-containing foil at temperatures below and/or proximate to cryogenic temperature ranges (which may be defined as from negative 150 degrees Celsius ° C. (negative 238 degrees Fahrenheit (° F.)) to absolute zero (negative 273° C. or negative 460° F.)), a high magnetization may be achieved, which may lead to a relatively high saturation magnetic flux density of Dy metal of 3.8 Tesla at 4.2 K. This may be one of the higher saturation magnetic flux density values for any known material thereby giving the electric machine disclosed herein an increased power density.

In some instances, the cooling system may be capable of maintaining a cryogenic fluid, which may be used to cool the foil to a temperature below and/or proximate to cryogenic temperature ranges. The one or more channels may direct the cryogenic fluid through the cooling plate in close proximity to the foil to cool the foil. In other instances, non-cryogenic coolants such as water/glycol mixtures, oil-based mixtures, or refrigerants in liquid and/or gaseous states may be substituted and directed by one or more channels in the cooling plate.

In various embodiments, the stator assembly may include a stator core that defines an outer ring and a plurality of teeth extending circumferentially inward. Likewise, the cooling plate may include a cooling plate ring and a plurality of teeth extending circumferentially inward from the cooling plate ring. The one or more channels may extend both in the cooling plate ring and/or the teeth. The one or more channels within the teeth may be capable of directing the fluid within the channel to positions that are proximate to the hottest regions of the electric machine, thereby increasing the amount of heat that may be rejected from the electric machine.

To further increase heat rejection, the one or more channels may include one or more dimples, or turbulators, that may repetitively restart the thermal boundary layer of the cooling fluid portions of the channels. Additionally, or alternatively, the dimples may increase the surface area of the channels relative to the cooling plate. The larger surface area of the channels may allow for a greater amount of heat to be rejected by the fluid through a cascade of wetted surface dimples which repetitively restart the thermal boundary layer in a cooling flow through the channel. In various examples, the dimples may provide a beneficial/practical improvement in the ratio of cooling gain divided by coolant pumping power penalty when compared to other various turbulators that may further obstruct the fluid flow through the channel.

The electric machine provided herein may allow for high heat rejection capabilities and loss recovery during usage of the propulsion system. In addition, by reducing the temperature of the stator assembly, the power density of the electric machine may be increased, which may lead to a greater magnetic field. Furthermore, the electric machine provided herein may be capable of rejecting heat from the warmest regions of the machine through the placement of one or more channels within the teeth of the cooling plate. By reducing the peak temperatures of the electric machine, machine uprates may be achieved. Moreover, the electric machine provided herein may experience reduced thermal stress when compared to currently available electric machines through uniform or generally uniform cooling across the stator assembly.

The electric machine provided herein may incorporate a direct current (DC) rotor, a permanent magnet rotor, and/or any other practicable type of rotor. In addition, the electric machine provided herein may be an alternating current (AC) synchronous, an AC induction, a switched reluctance, or any other practicable type of electric machine.

Referring now to the drawings, wherein identical numerals indicate the same elements throughout the figures, FIG. 1 generally illustrates an aircraft 10 having at least one engine, shown as a left engine system 12 and a right engine system 14. Alternatively, the power system can have fewer or additional engine systems. The aircraft 10 generally may be utilized to transport persons, cargo, and/or other payload, and may be a commercial aircraft, a military aircraft, or a weapon, such as a missile.

In some non-exclusive examples the left and right engine systems 12, 14 may be configured as scramjets to provide thrust to aircraft 10. The aircraft 10 that utilizes at least one scramjet engine according to the present disclosure generally may be configured to operate at transonic, supersonic, hypersonic, or faster speeds, that is, speeds in excess of Mach 0.8. As used herein, a Mach number is intended to indicate a speed with respect to (i.e., divided by) a speed of sound in the ambient air, such as may be affected by properties of the ambient air such as temperature. Or in other words, the engine is configured as a scramjet that is configured to propel an aircraft 10 at speeds in excess of Mach 0.6, Mach 0.7, Mach 0.8, Mach 0.9, Mach 1, Mach 11, Mach 15, or faster, such as up to Mach 25 or faster.

The left and right engine systems 12, 14 can be substantially identical, or varied relative to one another, and can further include at least one electric machine 16. In various embodiments, the aircraft 10 can include various power sources 18, such as supplemental power sources, redundant power sources, auxiliary power sources, or emergency operation power sources, including but not limited to an electrical power storage unit, such as a battery. The aircraft 10 is shown further having a set of power-consuming components, or electrical loads 20, including, but not limited to, an actuator load, flight critical loads, and non-flight critical loads.

The electrical loads 20 are electrically coupled with at least one of the power sources 18 and/or at least one of the electrical machines via a power distribution system including, for instance, power transmission lines 22 or bus bars. It will be understood that the illustrated aspects of the disclosure of FIG. 1 is only one non-limiting example of a power distribution system, and many other possible aspects and configurations in addition to that shown are contemplated by the present disclosure. Furthermore, the number of, and placement of, the various components depicted in FIG. 1 are also non-limiting examples of aspects associated with the disclosure.

In the aircraft 10, the operating left and right engine systems 12, 14 provide mechanical energy which can be extracted, possibly via a spool, to provide a driving force for the electrical machines. The electrical machines, in turn, may generate power, such as AC or DC power, and may provide the generated power to the transmission lines 22, which delivers the power to the electrical loads 20, positioned throughout the aircraft 10.

It will be understood that while aspects of the disclosure are shown in an aircraft environment of FIG. 1, the disclosure is not so limited and has general application to electrical power systems in non-aircraft applications (aeroderivative engines/applications), such as other mobile applications and non-mobile industrial, commercial, and residential applications. For example, the system 12 described herein may be used for a liquid-hydrogen cooled electric power plant. It will be understood that the illustrated aspects of the disclosure are only one non-limiting example of an aircraft 10, and many other possible aspects and configurations in addition to that shown are contemplated by the present disclosure.

Furthermore, the number of, and placement of, the various components depicted in FIG. 1 are also non-limiting examples of aspects associated with the disclosure. For example, while various components have been illustrated with relative position of the aircraft 10, aspects of the disclosure are not so limited, and the components are not so limited based on their schematic depictions. Additional aircraft 10 configurations are envisioned.

Figure 2:
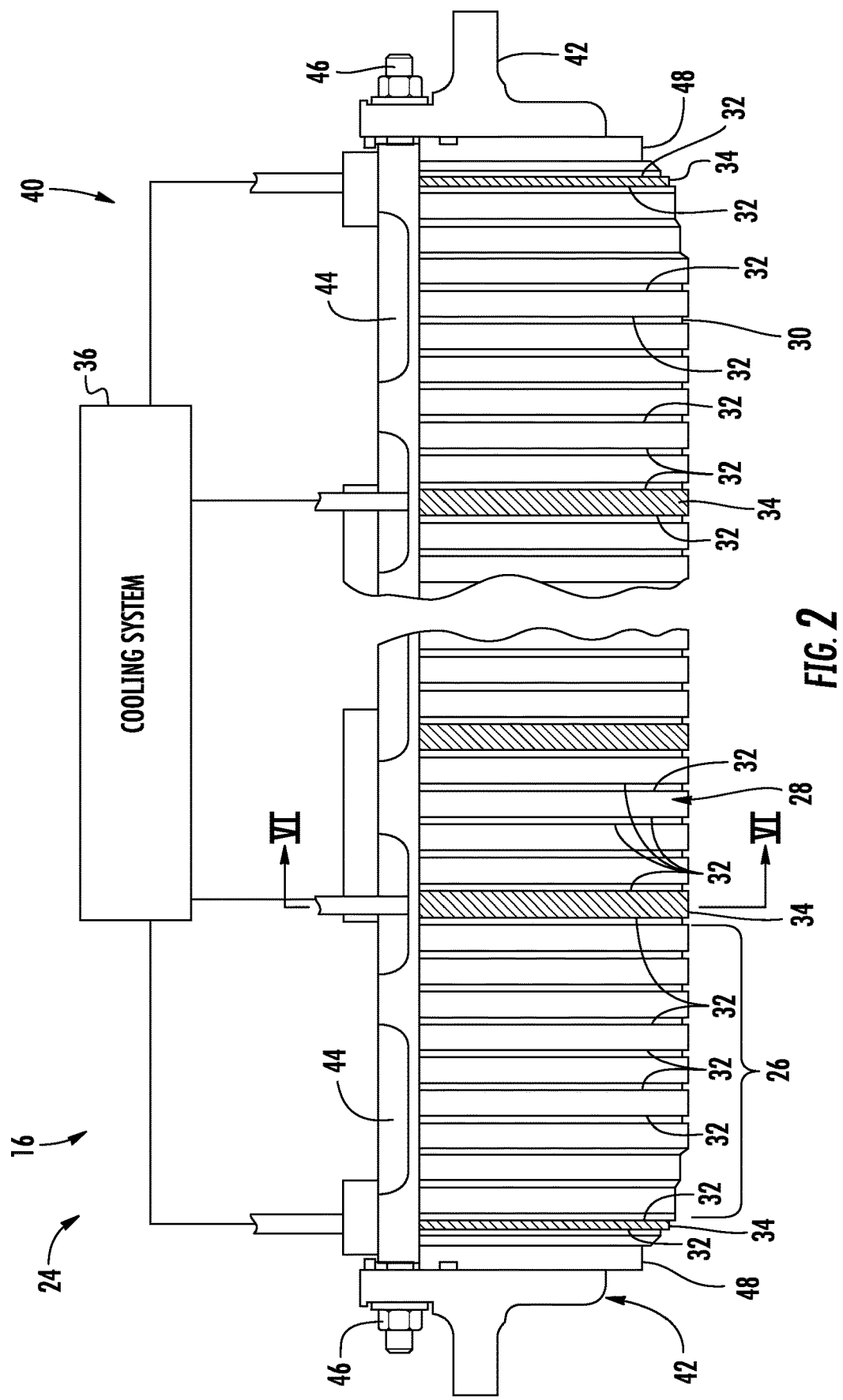
FIG. 2 is a cross-sectional schematic view of a stator core within a stator assembly of the electric machine in accordance with various aspects of the present disclosure.

Referring to FIG. 2, a stator assembly 40 can include a stator core 24 the stator core 24 may include one or more lamination packages 26 that each include one or more laminations 28 and/or one or more foils 30 stacked on top of each other.

In some embodiments, an axially stacked array of flat metal laminations 28 may be die-stamped (or punched) from sheets of electrical steel, such as for example, grain-oriented and non-grain oriented steels. In various embodiments, the laminations 28 can be made as thin as practical to decrease electrical eddy current losses and can be electrically insulated from one another. In addition, the laminations 28 can be arranged in a flat-side to flat-side relationship, as well as a registered edge-to-edge relationship to form an annular structure. Although not illustrated in FIG. 2, the layers can be staggered so that slot dovetails of the laminations 28 are registered, while seams between laminations 28 are not registered with those of adjacent layers. The slot dovetails accommodate electrical conductors that form the stator winding and are restrained by wedges installed in the dovetails.

In some examples, the laminations 28 may be formed from a magnetic material having soft magnetic behavior having a high permeability, high saturation induction flux density, low hysteresis-energy loss, and low eddy-current loss in alternating flux applications. In addition, the first material may be exemplified by having a low cost, high availability, high strength, high corrosion resistance, and an ease of processing. In some examples, the first material may be a ternary iron-cobalt-vanadium (Fe—Co—V) alloy that is capable of high magnetic induction at moderately high fields. In a common form, the composition of Fe—Co—V soft magnetic alloys can exhibit a balance between favorable magnetic properties, strength, and resistivity as compared to magnetic pure iron or magnetic silicon steel. In addition, Fe—Co—V alloys can have a high saturation magnetic flux density and can have a chemical composition of about 48-52% by weight Co, less than about 2.0% by weight V, incidental impurities and the remainder Fe, or any other practicable composition, which may have a saturation magnetic flux density of 2.4 Tesla.

In some embodiments, a foil 30 may be positioned between the array of flat metal laminations 28 and be formed from a material that is different from the laminations 28. In various examples, the lamination package 26 may include one or more laminations 28 and one or more foils 30 that are stacked one on top of another in any desired order. For instance, in various embodiments, more than one lamination packages 26 between each foil 30, and/or the more than one foil 30 sandwiched between a pair of laminations 28.

In some embodiments, the foil 30 may be formed from, or include, a rare earth metal, which may be in the lanthanide series. For instance, the foil 30 may be formed from or contain dysprosium, which may have one of the largest magnetizations. Additionally, or alternatively, the foil 30 may be formed from any other material that is capable of unveiling various properties at cryogenic temperature ranges. Additionally, or alternatively, still, the foil 30 may be formed from any other practicable material without departing from the teachings provided herein.

In some embodiments, a coating 32, which may be in the form of a film, surface treatment, and/or the like, may be disposed over one or more surfaces of the laminations 28, foils 30, and cooling plates 34. In some examples, the coating 32 may be an externally positioned overcoating that generally exhibits thermally-conductive and electrically insulative properties with a thickness that may be less than 10 μm, or less than 5 μm, which can ensure sufficient electrical insulation and dielectric strength. The external positioning may be of any external surface of the cooling plate 34. For example, in some instances, the external surfaces of the cooling plates 34 facing adjacent laminations 28, foils 30, and cooling plates 34 may be the externally-overcoated surfaces. In various embodiments, the coating 32 may be deposited on the laminations 28, foils 30, and cooling plates 34 through chemical vapor deposition (CVD), physical vapor deposition (PVD), or any other practicable process.

In some examples, the coating 32 may be a CVD diamond coating. Additionally, or alternatively, the coating 32 may be a nitride insulator such as aluminum nitride (A1N) and/or boron nitride (BN) that exhibits thermal conductivity, abrasion resistance, hardness, stability at high temperature, thermal shock resistance and the like. Since boron nitride can be immune to deterioration due to a carburizing phenomenon, boron nitride coatings 32 can be used, which can provide insulation at high temperatures that can be experienced by the electric machine 16 when the electric machine 16 is in use, such as when the aircraft 10 travels at transonic and faster speeds.

With further reference to FIG. 2, in some embodiments, the stator assembly 40 may also include one or more cooling plates 34 that are externally-overcoated by one or more coatings 32 arranged between each lamination package 26. In various embodiments, the cooling plates 34 may be formed of, or include, a nonferromagnetic material. In such a manner, the cooling plates 34 of the stator assembly 40 may not transmit any (or minute amounts of) magnetic flux. As such, the cooling plate 34 of the stator assembly 40 may substantially magnetically isolate a first lamination package 26 from a second lamination package 26. In various embodiments, a surface treatment process may be used to increase thermal contact conductance and/or electrical contact resistance of the cooling plate surfaces. Such a cooling plate surface treatment process may consist of abrasive subtractive machining and/or chemical milling to reduce surface roughness followed by over-coating with at least one coating 32 of material which increases heat conduction and/or decreases electron conduction.

Moreover, in order to maintain a temperature of the stator assembly 40 within a desired operating temperature range, the electric machine 16 includes a cooling system 36. In some embodiments, the cooling plates 34 may define one or more cooling channels 38 (FIG. 5) extending therethrough that is in fluid communication with the cooling system 36. In some embodiments, such as the one illustrated in FIG. 2, the cooling system 36 is coupled to each of the channels 38 within a respective cooling plate 34. In such a manner, the cooling system 36 may provide the cooling plate 34 of the stator assembly 40 with a cooling fluid F during operation. The cooling fluid F may be, e.g., lubrication oil, supercritical fluids, a consumable liquid (such as water), or any other suitable cooling fluid.

In various examples, the cooling system 36 may maintain a fluid F within a cryogenic temperature range, which may be defined as from −150° C. (−238° F.) to absolute zero (−273° C. or −460° F.). For instance, the fluid F may be maintained as a cryogen that is in its supercritical state such that it will not undergo a phase transition between liquid and gas. In various examples, the cryogenic fluid may be Helium-3, Helium-4, Hydrogen, Neon, Nitrogen, Air, Fluorine, Argon, Oxygen, and/or Liquified Natural Gas (LNG) including, but not limited to, Methane, Ethane, Propane, Butane, and/or combinations thereof.

In various examples, during operation, heat is generated by the electric machine 16. While the electric machine 16 is operated and the heat is generated, the cooling system 36 may move the fluid F through the cooling plates 34 to reduce the heat of the stator assembly 40. In some instances, while an aircraft 10 is operating at speeds in the transonic range, the supersonic range, the hypersonic range, and/or greater than the hypersonic range, greater amounts of heat are generated than when an aircraft 10 is operated at speeds below the transonic range. By cooling the stator assembly 40 with a cooling system 36 that operates in the cryogenic temperature range may allow for the electric machine 16 to achieve higher power densities. Moreover, in embodiments in which the foil 30 is at least partially formed from dysprosium, various material advantages such as an increase in the magnetic flux density can be unveiled as the temperatures reach cryogenic ranges.

In various embodiments, such as the one illustrated in FIG. 2, a pair of stator core flanges 42 is disposed at opposing ends of the stator core 24. A key bar 44 is retained in stator core flanges 42 by a key bar nut 46. Although not illustrated in FIG. 2, the key bar 44 couples to the axially stacked array of flat metal laminations 28, the foil 30, and an outside space block assembly 48 via key bar dovetails. In operation, the stator core flanges 42 and the key bars 44 are used to maintain a compressive load on the core 24 including the axially stacked array of the flat metal laminations 28, the flat metal laminations 28, the foil 30, the cooling plates 34, and the outside space block assembly 48.

For sake of simplicity in explaining the various embodiments of the present disclosure, only certain components of stator core 24 are described herein. Those skilled in the art will recognize that stator core 24 can have more componentry than what is illustrated in FIG. 2 and described herein for use with an electric machine 16.

Figure 3:
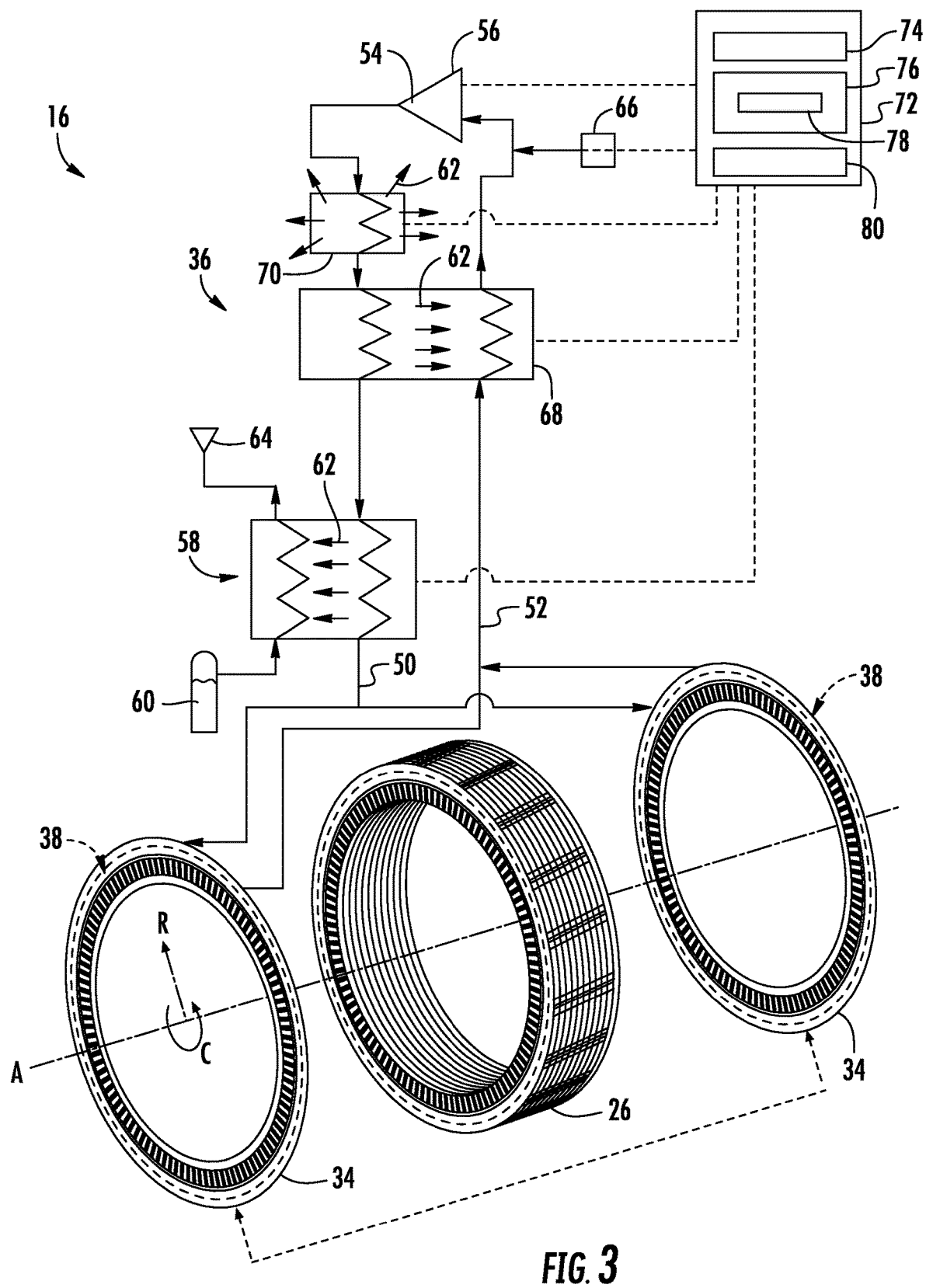
FIG. 3 is an exploded view of a lamination package and a cooling plate operably coupled with a cooling system in accordance with various aspects of the present disclosure.

Referring to FIG. 3, in some embodiments, first and second cooling plates 34 may be disposed on each side of a lamination package 26. In various embodiments, each lamination package 26 and/or cooling plate 34 may be of a common width. Or, alternatively, the width of the lamination package 26 and/or the cooling plate 34 may be varied along the axial direction of the electric machine 16.

During operation of the electric machine 16, heat may be generated by the electric machine 16. Through the one or more channels 38 within the cooling plates 34 and the cooling system 36 that is operably coupled with the one or more channels 38, heat may be rejected from the cooling system 36. In various embodiments, each cooling plate 34 may be independently coupled with the cooling system 36 and/or a first cooling plate 34 may be fluidly coupled to a second cooling plate 34. Further, in various embodiments, each cooling plate 34 may be fluidly coupled to one or more channels 38 of another cooling plate 34 and the cooling system 36.

In various embodiments, such as the embodiment illustrated in FIG. 3, the cooling system 36 can include a cooling system supply line 50 and a return line 52 in communication with the one or more of the cooling plates 34 (e.g., one or more of the channels 38 within each of the one or more cooling plates 34). The cooling system supply line 50 and return line 52 transport a first cooling fluid 54, which may be a cryogen cooling fluid, to and from the one or more channels 38 of each of the cooling plates 34. It should be understood that the cooling system supply line 50 and return line 52 may be formed in a variety of configurations suitable for this purpose. Similarly, although a variety of first cooling fluid 54 are contemplated, some embodiments utilize a hydrogen fluid/gas for the first cooling fluid 54.

A fluid movement assembly 56, which may include a blower, compressor, pump, or the like is positioned between the cooling system supply line 50 and the return line 52 opposite the cooling plate 34. The fluid movement assembly 56 can be responsible for movement of the first cooling fluid 54 throughout the one or more channels 38. By way of compressing and moving the first cooling fluid 54 through the cooling system 36, the temperature of the electric machine 16 can be lowered during operation.

To increase the thermal efficiency of the cooling system 36, in some embodiments, a pre-cooler assembly 58 may be in thermal communication with the first cooling fluid 54 through the cooling system supply line 50. The pre-cooler assembly 58 can be positioned immediately adjacent to the cooling plate 34. The term immediately adjacent is intended to be defined as closer in flow proximity to the cooling plate 34 than the subsequently described heat exchangers. The pre-cooler assembly 58 can be configured in a variety of fashions. For example, in various embodiments, the pre-cooler assembly 58 can place a second fluid 60, which may be a second cryogen fluid, in a pre-cooler supply line that can be in thermal communication with the cooling system supply line 50 such that thermal energy 62 is drawn from the cooling system supply line 50 into the pre-cooler supply line. This reduces the temperature of the first cooling fluid 54 prior to entering the cooling plate 34. This, in turn, improves the efficiency of the cooling system 36.

Although the second fluid 60 can be provided in a variety of fashions, various embodiments can use a source of compressed cryogen 60 in communication with the pre-cooler supply line. The compressed second fluid 60 can be controllably released into the pre-cooler supply line to control pre-cooling of the first cooling fluid 54. In these embodiments, a vent 64 may be placed in communication with the pre-cooler supply line in a position opposing the source of compressed cryogen 60. The vent 64 is utilized to allow the second fluid 60 to be vented into the atmosphere. Depending on the size of the operational environment, it may be desirable to position the vent 64 such that the second fluid 60 is vented into outside atmosphere. Although the second fluid 60 may be comprised of a variety of materials, some embodiments contemplate the use of liquid nitrogen. This allows for a relatively inexpensive refrigerant to be utilized while protecting a more expensive cryogen within the comparatively closed-loop system of the first cooling fluid 54 flow path. It should be understood that although the first cooling fluid 54 flow may be considered closed-loop, losses of the first cooling fluid 54 are contemplated during normal operation. To this end, the cooling system 36 may further include a make-up gas supply 66 in communication with the return line 52 in order to replace any losses of the first cooling fluid 54.

In some instances, the cooling system 36 may include a regenerative heat exchanger 68 in communication with both the cooling system supply line 50 and the return line 52 to mitigate issues that may arise from the low temperatures of the first cooling fluid 54 returning from the cooling plate 34 to the fluid movement assembly 56. The regenerative heat exchanger 68 is positioned between the cooling plate 34 and the fluid movement assembly 56. The regenerative heat exchanger 68 places the cooling system supply line 50 in thermal communication with the return line 52 such that thermal energy 62 may be transferred from the cooling system supply line 50 into the return line 52. In this fashion, thermal energy 62 contained in the cooling system supply line 50 may be utilized to raise the temperature of the first cooling fluid 54 entering the fluid movement assembly 56. This prevents the first cooling fluid 54 from freezing or seizing the fluid movement assembly 56 bearings, which may allow for the use of low-cost fluid movement assemblies 56 to be utilized.

In some examples, the cooling system 36 may also include an after-cooler heat exchanger 70 that is in thermal communication with the cooling system supply line 50 and is configured to transfer thermal energy 62 from the first cooling fluid 54 to the atmosphere. The after-cooler heat exchanger 70 can be positioned between the regenerative heat exchanger 68 and the fluid movement assembly 56. This rejects the heat of compression into ambient air rather than into the refrigeration media. This can reduce the consumption of the second fluid 60 and increase the thermodynamic efficiency of the process. This, in turn, minimizes entropy production and can reduce refrigerant costs.

Although numerous heat exchangers have been referenced in the above application, it should be understood that the present invention contemplates the use of any present or future methodologies for transfer of thermal energy that will function as described and claimed. Furthermore, it is contemplated that the regenerative heat exchanger 68 and the pre-cooler assembly 58 may be protected from ambient conditions such as temperature and moisture by standard cryogenic industry practices.

Moreover, in some embodiments, the electric machine 16 can further include (or be operably coupled with) a computing system 72. The computing system 72 has one or more processors 74 and memory 76. The memory 76 stores data 78. The data 78 may include instructions that, when executed by the one or more processors 74, cause the electric machine 16 to perform certain functions. One or more the functions may be controlling any of the components described herein. Additionally, the computing system 72 includes a network interface 80. The network interface 80 may utilize any suitable wired or wireless communications network 160 to communicate with other components of the electric machine, remote components, and/or other components.

Figure 4:
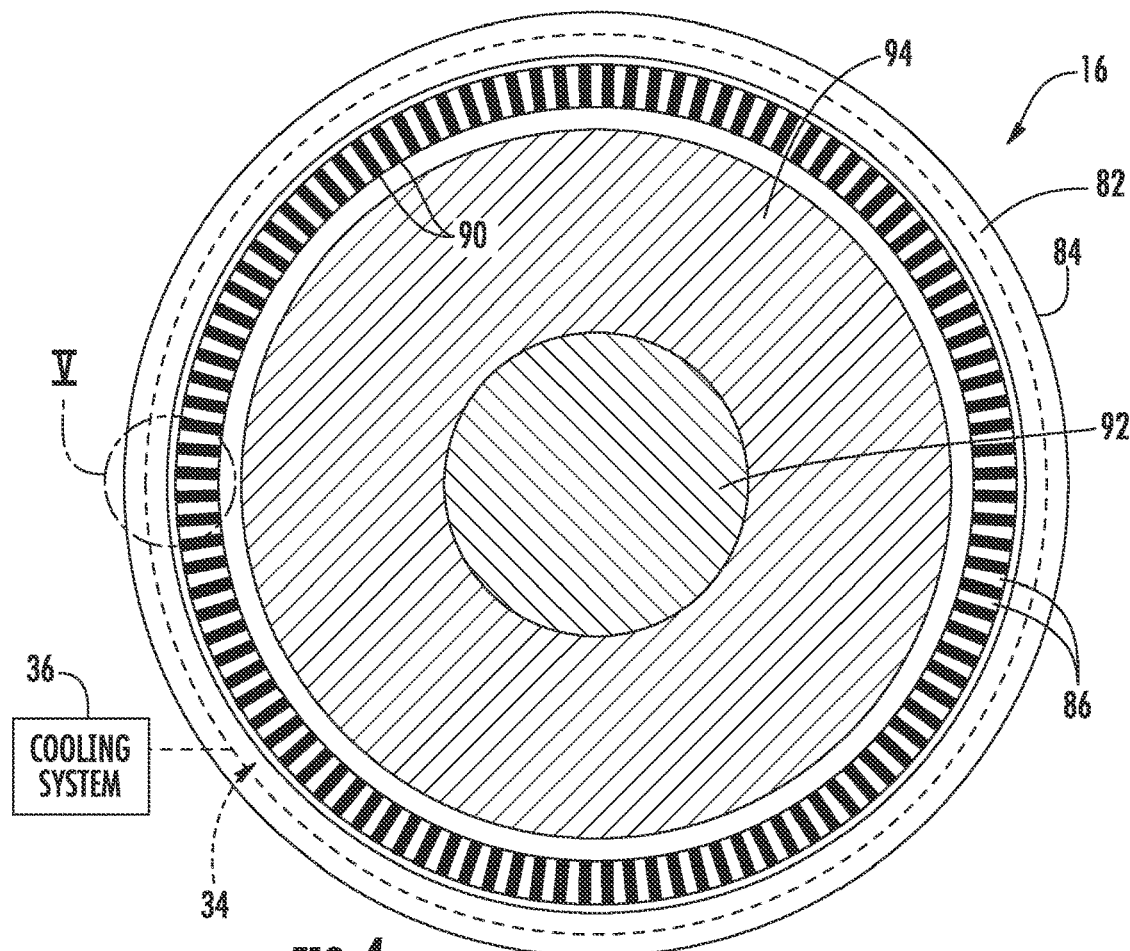
FIG. 4 is an end view of the electric machine in accordance with various aspects of the present disclosure.
Figure 5:
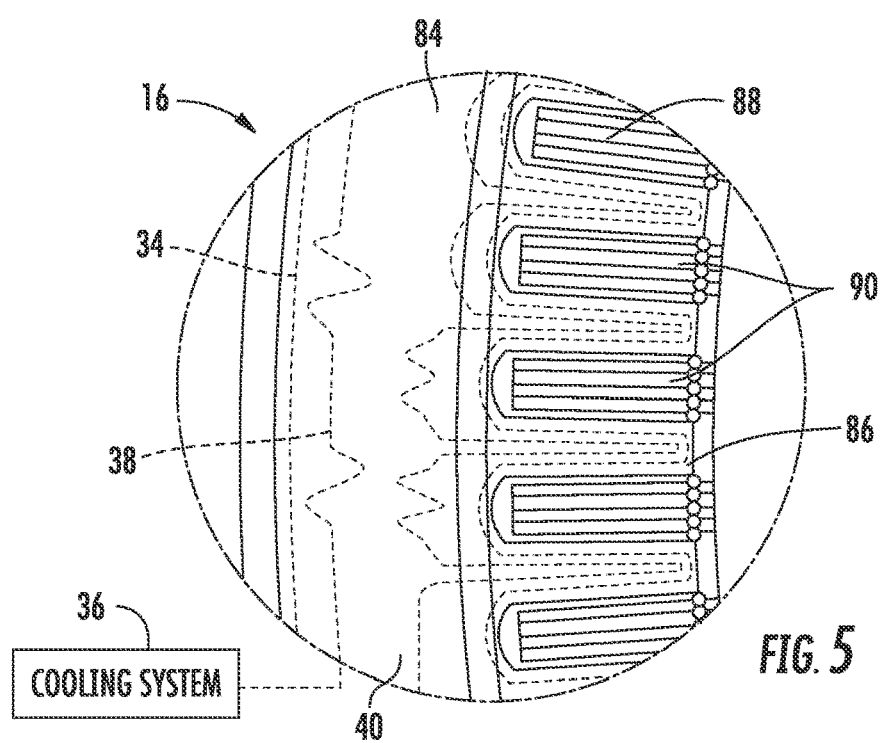
FIG. 5 is an enhanced view of section V of FIG. 4.

Referring now to FIGS. 4 and 5, in some embodiments, the stator assembly 40 can be formed of the lamination packages 26 and the cooling plates 34. In some embodiments, the lamination packages 26 define the core 24 that can have a circumferentially continuous core base or core ring 84. A set of posts or teeth 86 extend from the core 24 inward in a radial direction R towards a center point of the core 24. The set of teeth 86 can further define a set of slots 88, such as openings, gaps, spaces, or the like, between adjacent teeth 86. The stator assembly 40 may also include a conductive wire or sets of conductive wires to form one or more stator windings 90 and at least a subset of the slots 88 can be wound with the conductive wires.

With further reference to FIGS. 4 and 5, in some embodiments, the electric machine 16 includes a rotatable shaft 92 that is operably coupled with a rotor 94. During operation, the rotatable rotor 94 is mechanically powered, driven, or rotated by a force, such as the mechanical energy of the engine systems 12, 14, about an axis of rotation. The relative rotational motion of the rotatable rotor 94 relative to the fixed or stationary stator assembly 40 generates electrical power in the one or more stator windings 90 due to the interaction of the electric machine magnetic fields. The electrical power generated in the one or more stator windings 90 can be conductively connected to, and further delivered to, at least one electrical load 20 (FIG. 1) or power source 18 (FIG. 1). In one non-limiting aspect, the electric machine 16 can provide the electrical power to a power distribution system or power distributed network. By contrast, when operated as an electric motor, alternating current electric power (such as three-phase alternating current electric power) may be provided to the one or more windings 90 of the stator assembly 40 which produces rotational movement of the rotor 94.

As provided herein, one or more channels 38 may be defined by the cooling plates 34 within the stator assembly 40. The one or more channels 38 may be operably coupled to a cooling assembly (such as cooling system 36), or another fluid cooling system (such as an air cooling system), to maintain a temperature of the cooling plate 34 within a desired operating temperature range, and more specifically, to maintain a temperature of the stator assembly 40 within a desired operating to mature range.

Referring to FIGS. 6-11, the cooling plate 34, which may have a generally similar geometry to the laminations 28 and/or the foil 30 of the lamination packages 26, can include a circumferentially continuous cooling plate ring 96 and a set of teeth 98 extending from the cooling plate ring 96 radially inward. In various embodiments, in order to manufacture the cooling plate 34 having such features, an additive manufacturing printing process and/or a subtractive manufacturing process, or any other suitable combination thereof may be utilized. In such a manner, the one or more channels 38 may be integrally formed with other portions of the cooling plate 34. By contrast, however, in other exemplary embodiments, the cooling plate 34 may be formed through stamping, milling, coining, scribing, electric discharge, chemical etch, combinations thereof, and/or any other practicable process. Further, in certain exemplary embodiments, the cooling plate 34 may be formed through a suitable lamination process, or other suitable process.

Figure 6:
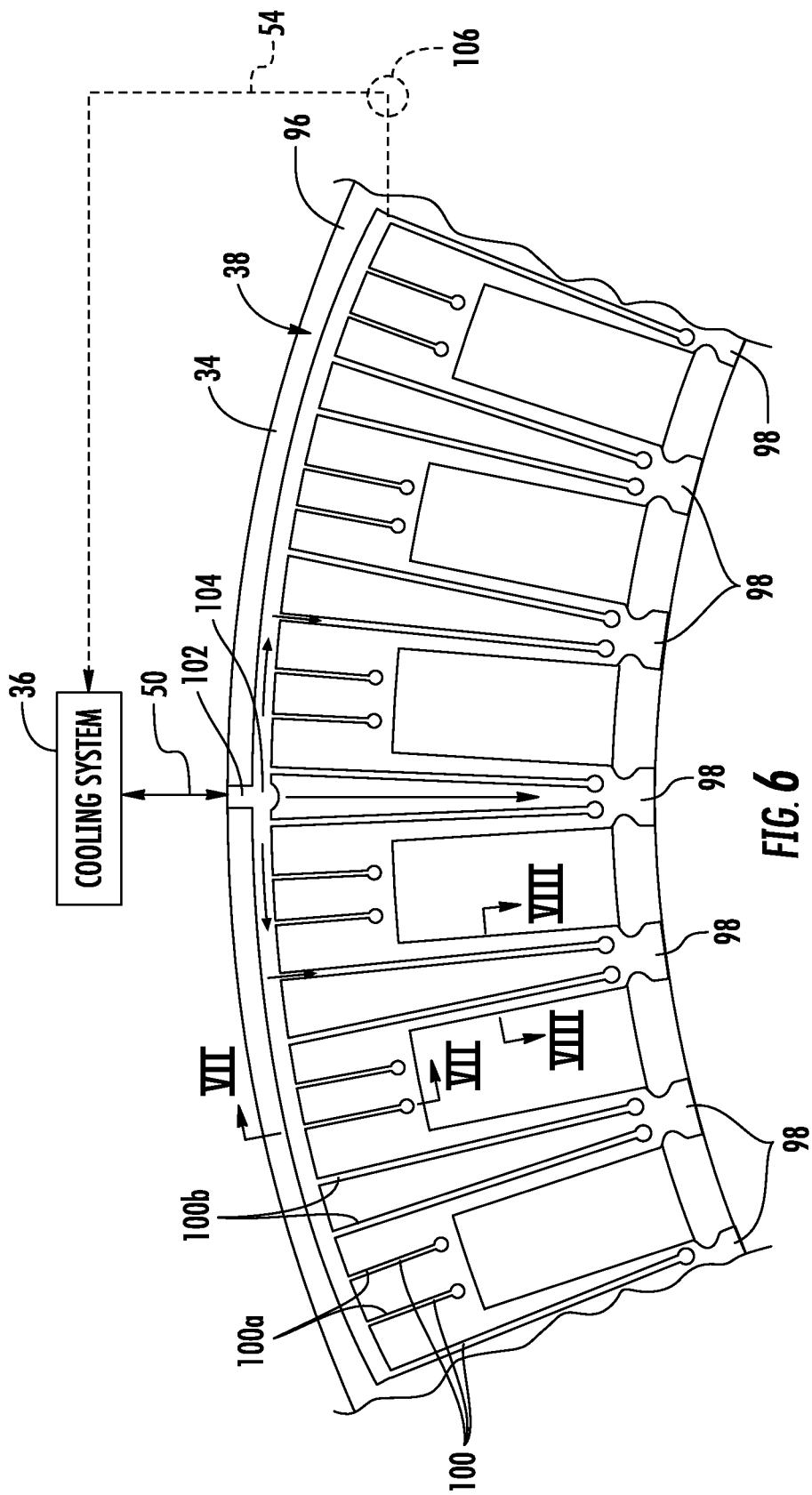
FIG. 6 is a cross-sectional view of the cooling plate taken along the line VI-VI of FIG. 2 in accordance with various aspects of the present disclosure.
Figure 7:
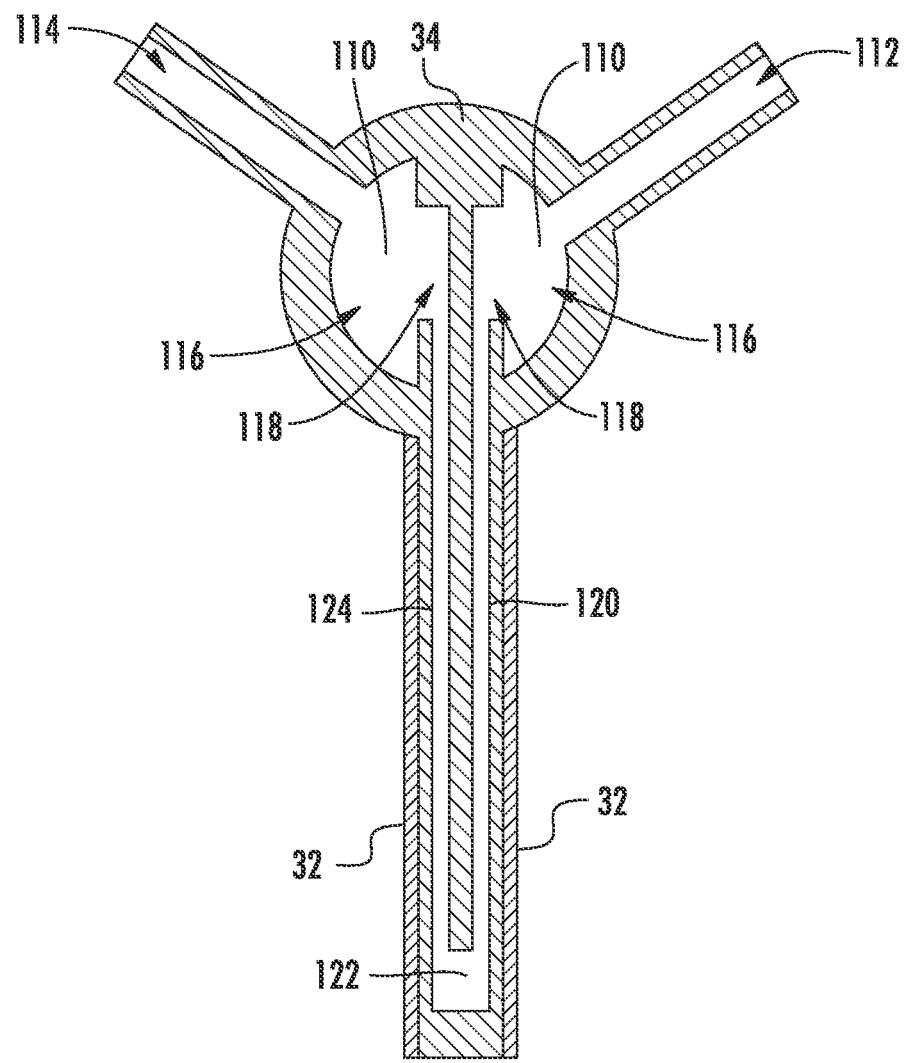
FIG. 7 is a cross-sectional view of the cooling plate taken along the line VII-VII of FIG. 6.
Figure 8:
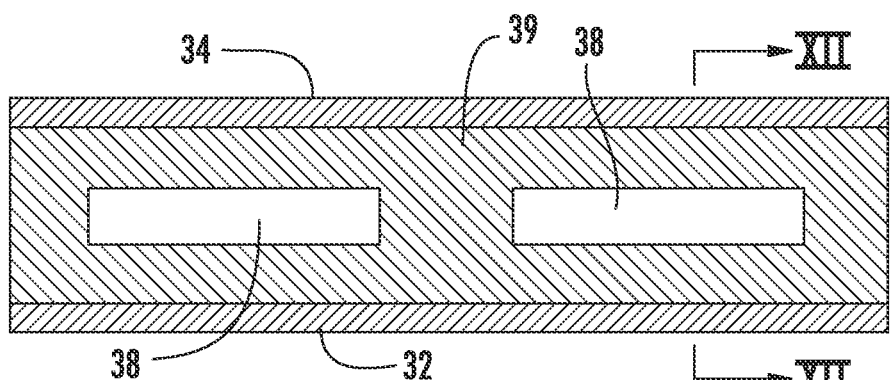
FIG. 8 is a cross-sectional view of the cooling plate taken along the line VIII-VIII of FIG. 6.

In some embodiments, such as the one illustrated in FIGS. 6-8, the one or more channels 38 within the cooling plate 34 may include a plurality of tributaries 100 that can each be fed by one or more of the channels 38. The one or more channels 38 and the tributaries 100 may be used to reduce the temperature of the cooling plate 34, which in turn, reduces the temperature of the stator assembly 40. By reducing the temperature of the heating assembly, the performance and/or the efficiency of the electric machine 16 may be increased.

In some examples, the one or more channels 38 may extend about the cooling plate ring 96. For example, in various embodiments, the one or more channels 38 may extend circumferentially about the cooling plate ring 96. In various embodiments, the one or more channels 38 may define an inlet 102 through which fluid may enter the one or more channels 38 of the cooling plate 34 from the supply line 50. A first bulb portion 104 having a width that is greater than at least a portion of the one or more channels 38 may be fluidly coupled with the inlet 102. From the bulb portion 104, the fluid may be directed through the one or more channels 38 and the one or more tributaries 100 extending from the one or more channels 38. A second bulb portion 106 may be positioned along the one or more channels 38 and be fluidly coupled with the one or more channels 38 and an outlet 108 from the one or more channels 38 to distribute the fluid to the return line 52. Once the fluid exits the one or more channels 38, the fluid may be directed through one or more other channels 38 of a common cooling plate 34, one or more channels 38 of another cooling plate 34, and/or through the cooling system 36 that is operably coupled with the cooling system 36.

The plurality of tributaries 100 may include a first set of tributaries 100a that extend radially inward from the one or more channels 38 within the cooling plate ring 96 and a second set of tributaries 100b that extends at least partially within the teeth 98 of the cooling plate 34. Each set of tributaries 100*a*, 100*b* may include any number of tributaries 100 without departing from the teachings provided herein. Moreover, the first set of tributaries 100*a* may define a hydraulic diameter of a first width and the second set of tributaries 100*b* may define a hydraulic diameter of a second width. In some instances, the first width may be different than the second width, which may alter a flow rate of the first channel relative to the second channel. For example, the first width may be less than the second width. Alternatively, the first width may be less than the second width. However, the first width may be generally equal to the second width without departing from the scope of the present disclosure.

In some embodiments, such as the ones illustrated in FIGS. 6-8, the first and/or the second set of tributaries 100 may include a pair of manifolds 110 that are respectively fed through an inlet port 112 and an outlet port 114. In various embodiments, the manifolds 110 may have any cross-sectional geometry that may be symmetrical or asymmetrical. For instance, in some embodiments, such as the those illustrated in FIGS. 6-8, each of the first and second manifolds 110 may include a first section 116, which may have a generally semi-spherical cross section, and a second section 118, which may have a generally rectangular cross section, at one end portion of the first section 116.

In some instances, the fluid may be directed from the one or more channels 38 into the first manifold through the inlet port 112, which may direct fluid initially into the first section 116 of the first manifold and on to the second section 118. From the second section 118, the fluid may be directed through a fluid distribution conduit 120 to an interlayer 122. A fluid collection conduit 124 may be positioned on a generally opposing side portion of the interlayer 122 from the distribution conduit 120. In some embodiments, the distribution conduit 120 and the collection conduit 124 may have a generally common width. However, in other embodiments, the distribution conduit 120 may have a width that is greater than the collection conduit 124 or the collection conduit 124 may have a width that is greater than the distribution conduit 120. Further, in various embodiments, the interlayer 122 may have a radial width and/or an axial width that is greater than the width of the distribution conduit 120 and/or the collection conduit 124. In some embodiments, such as those illustrated in the FIGS. 6-8, the interlayer 122 may have an axial width that is more than double the axial width of the distribution conduit 120 and the collection conduit 124.

In some embodiments, in addition to or in lieu of the tributaries 100, the one or more channels 38 may include a plurality of channels 38*a*, 38*b*, 38*c* that are in parallel. For instance, in the embodiment illustrated in FIGS. 9-11, a first one or more channels 38*a* may be positioned radially inward of a second channel 38*b* and a third channel 38*c* may be positioned generally radially outward of the second channel 38*b*. Each of the first, second, and third channels 38*a*, 38*b*, 38*c* may be operably coupled with an inlet 102 and an outlet 108.

In some embodiments, each cooling plate 34 may include one or more segments one of which is illustrated in FIG. 9. Fluid may be directed into and out of each segment independently. Alternatively, each cooling plate 34 may include a single inlet 102 and a single outlet 108. Moreover, once the fluid exits the channels 38*a*, 38*b*, 38*c* through the outlet 108, the fluid may be directed to another segment of the same cooling plate 34, to another cooling plate 34, and/or to a portion of the cooling system 36.

In various embodiments, each of the channels 38*a*, 38*b*, 38*c* may exhibit a unique path causing each of the channels 38*a*, 38*b*, 38*c* to be of a varied length relative to the remaining channels 38*a*, 38*b*, 38*c*. For instance, in the embodiments illustrated in FIGS. 9-11, the first channel 38*a* may extend within one or more teeth 98 of the cooling plate 34 and return to a position within the cooling plate ring 96.

The second channel 38*b* may also extend within one or more teeth 98 of the cooling plate 34 and within the cooling plate ring 96. In some embodiments, the second channel 38*b* may maintain a position radially outward of the first channel 38*a*. Moreover, in some embodiments, the second channel 38*b* may include one or more serpentine portions 126. The one or more serpentine portions 126 may be configured to assist in flow metering of the fluid within the channels 38*a*, 38*b*, 38*c*.

In some embodiments, the third channel 38*c* may also include one or more serpentine portions 126. Like the one or more serpentine portions 126 of the second channel 38*b*, the one or more serpentine portions 126 of the third channel 38*c* may also assist in adjusting a mass flow splitting of the fluid within the first, second, and third channels 38*a*, 38*b*, 38*c*. Accordingly, in various embodiments, each channel 38*a*, 38*b*, 38*c* within the cooling plate 34 may have a varied fluid flow rate therein relative to one another. The varied flow rates may allow for distinct portions of the cooling plate 34 to remove more heat from the remaining portions of the cooling plate 34.

Each of the channels 38*a*, 38*b*, 38*c* within the cooling plates 34 may be tailored to reduce heat from desired portions of the electric machine 16. For instance, in some embodiments, the first and second channels 38*a*, 38*b* may each extend within each of the teeth 98 of the cooling plate 34 as a radially inward portion of the cooling plate 34 may be the warmest portion of the cooling plate 34 while the electric machine 16 is in use due to its proximity to a radial inward portion of the lamination package 26 and/or the one or more windings 90 provided about the lamination package 26 (and the cooling plate 34). In addition, it will be appreciated that the channels 38 may extend radially and/or axially to remove heat from various other portions of the cooling plate 34.

As provided above, when the electric machine 16 is in use, heat is generated, which reduces the efficiency of the electric machine 16. Moreover, in instances in which the aircraft 10 travels at speeds of that are in the transonic or faster ranges, even more heat is created. To reject heat from the electric machine 16, fluid flows through the one or more channels 38 of the cooling plate 34. In some instances, the serpentine portions 126 can adjust fluid flow rates through each distinct channel 38 of the cooling plate 34. In addition, the serpentine portions 126 may also increase the surface area of the channels 38 along the cooling plate 34 thereby leading to greater heat transfer from the lamination packages 26 to the fluid within the cooling plates 34. The fluid may flow through one or more channels 38 and the cooling system 36. The cooling system 36 may maintain the fluid at a cryogenic temperature range, which in turn may increase the magnetic field (or any other property) of a material within the lamination package 26, such as the foil 30. For example, Accordingly, the electric motor provided herein may be capable of creating a greater power density and operate in a more efficient manner through the use of specific materials within the lamination package 26 and the usage of the cooling plate 34 with the one or more channels 38 that are operably coupled with the cooling system 36.

Referring to FIGS. 6-16, in various embodiments, each of the channels 38 may have a non-uniform shape along each respective channel 38. The non-uniform shape may affect the flow of the fluid through the one or more channels 38 through altering a pressure, altering a flow rate, repetitively restarting the thermal boundary layer of the cooling fluid, changing a flow from a laminar flow to a turbulent flow (or vice versa), increasing the surface area of the one or more channels 38 along the cooling plate 34 thereby increasing heat rejection properties of the cooling plate 34, etc.

Generally, the more often the thermal boundary layer of the cooling fluid is restarted and/or the more turbulent the flow, all other things being equal, the greater the rate of heat transfer. Stated another way, the higher the Reynolds number, the more rapid the rate of heat transfer. In addition, a laminar flow of fluid within the one or more channels 38 may make uniform heat transfer and/or desired rates of heat transfer more difficult. As such, in some embodiments, the one or more channels 38 may include one or more dimples 128, or turbulators, that may be integrally formed with the one or more channels 38 and/or positioned within the one or more channels 38 that are configured to increase or decrease a cross-sectional volume of at least one of the one or more channels 38. As provided herein, the cooling plate 34 may be formed through additive and/or subtractive manufacturing processes and, in some embodiments, the dimples 128 may be simultaneously formed with various portions of the cooling plate 34 during the additive manufacturing process. Further, the dimples 128 and/or the cooling plate 34 may be formed in any manner, such as stamping, milling, coining, scribing, electric discharge, chemical etch, and/or combinations thereof.

The larger surface area of the one or more channels 38 may allow for a greater amount of heat to be rejected by the fluid through a cascade of wetted surface dimples 128 which repetitively restart the thermal boundary layer in a cooling flow of the cooling fluid 54 (FIG. 3) through the one or more channels 38. In various examples, the dimples 128 may provide an improvement in the ratio of cooling gain relative to a coolant pumping power penalty when compared to other various turbulators that may further obstruct the fluid flow through the one or more channels 38. For instance, the pump power may be reduced when the dimples 128 are configured as concave features whereby the flow area expands before contracting in a non-abrupt manner to repetitively restart the thermal boundary layer.

Figure 12A:
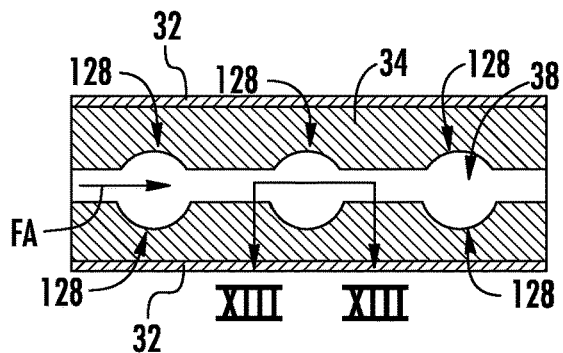
FIGS. 12A-12C are various cross-sectional views of a channel of the cooling plate taken along the line XII-XII of FIGS. 10 and 11 in accordance with various aspects of the present disclosure.
Figure 12B:
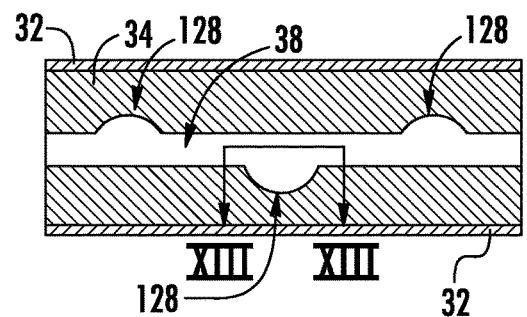
Figure 12C:
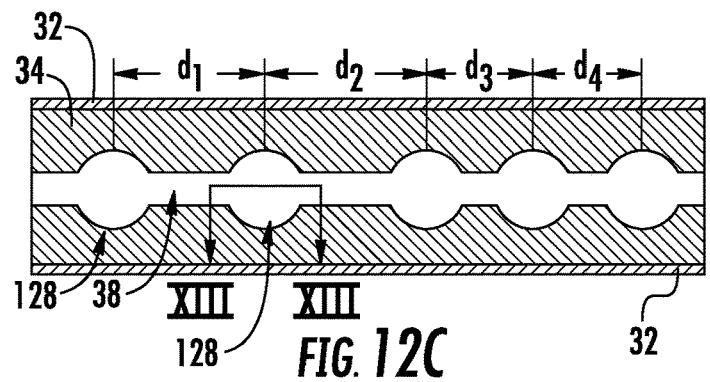
Figure 13A:
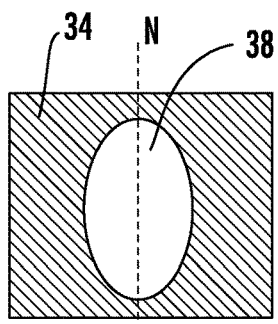
FIGS. 13A-13E are various cross-section views of the channel taken along the line XIII-XIII of FIGS. 12A-12C in accordance with various aspects of the present disclosure.
Figure 13B:
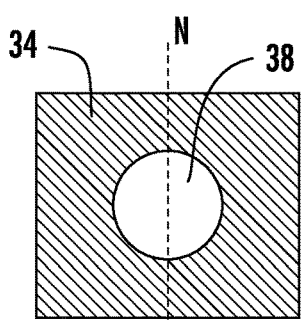
Figure 13C:
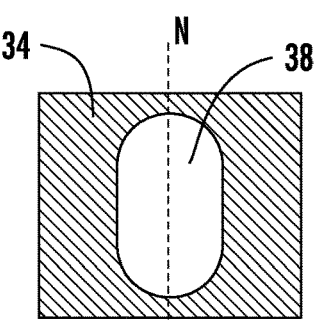
Figure 13D:
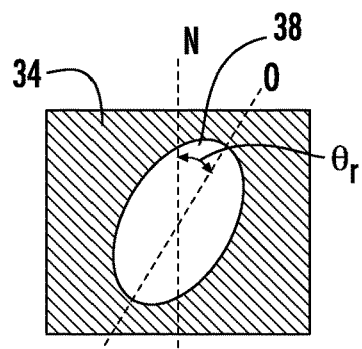
Figure 13E:
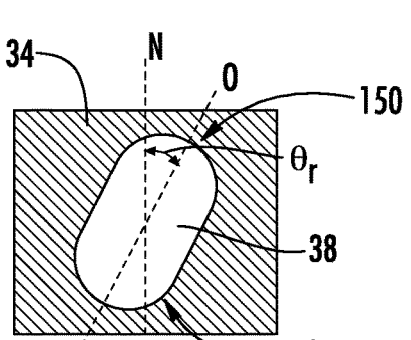

As illustrated in FIGS. 12A-12C, in some embodiments, the dimples 128 may be configured as one or more dimples or grooves may be formed within the one or more channels 38. The shape, number, and placement of one or more dimples or grooves may each be varied other than as illustrated. In some examples, the one or more dimples or grooves may extend in a direction that is generally perpendicular to the fluid axis FA of the one or more channels 38, or in any other direction. Moreover, the dimples 128 may extend away from the flow axis FA of the one or more channels 38 and/or towards the flow axis FA. The geometries of the raised dimples and/or grooves may be modified in the cooling plate 34 to achieve a desired amount of cooling within the constraints of the cooling plate 34. For example, the size, number, and spacing of the raised dimples and the number, depth, and placement of the grooves may be modified. For instance, as illustrated in FIG. 12A, in some examples, a first dimple may extend from an upper surface of the one or more channels 38 and a second dimple may be aligned along a lower surface of the one or more channels 38 relative to the fluid axis FA of the one or more channels 38. Additionally, or alternatively, as illustrated in FIG. 12B, the first dimple may be offset from the second dimple relative to the fluid axis FA of the one or more channels 38. Moreover, as illustrated in FIG. 12C, the distance between dimples on along the surface of the one or more channels 38 may be generally consistent or varied there along. For example, as illustrated in FIG. 12C, a first dimple may be separated from an adjacent dimple by a first distance $d_1$, the second dimple may be separated from a third dimple by a second distance $d_2$, the third dimple may be separated from a fourth dimple by a third distance d3, and the fourth dimple may be separated from a fifth dimple by a fourth distance $d_4$. Each distance $d_1$, $d_2$, $d_3$, $d_4$ may be varied from the remaining distances $d_1$, $d_2$, $d_3$, $d_4$ or equal to one or more of the other distances $d_1$, $d_2$, $d_3$, $d_4$ while varied from the remaining distances $d_1$, $d_2$, $d_3$, $d_4$. Alternatively, in some embodiments, each of the distances $d_1$, $d_2$, $d_3$, $d_4$ may be generally equal to one another. In addition, the height of the dimples may be constant or varied along portions of the one or more channels 38.

As illustrated in FIGS. 13A-E, the one or more channels 38 and/or the dimples 128 may have any cross-sectional geometry. The cross-section geometry may be constant along the one or more channels 38. Alternatively, the cross-section geometry of the one or more channels 38 may be varied along the flow axis FA of the one or more channels 38. For instance, portions of the one or more channels 38 may have a cross section that is generally ellipsoidal (e.g., FIG. 13A), hemispherical (e.g., 13B), oval (e.g., 13C), and/or any other shape with any offset orientation angle θr (e.g., 13D, 13E) relative to a neutral axis N. As used herein, an orientation angle can be defined by an angle θr defined between a generally central axis O of a geometric shape that forms the one or more channels 38. In some examples including a geometric shape with any offset orientation angle θr, the offset orientation angle θr may cause a larger section of a first portion 150 of the one or more channels 38 to be disposed on a first side of the neutral axis N and a larger section of a second portion 152 of the one or more channels 38 to be disposed on an opposing second side of the neutral axis N. It will be appreciated that the orientation angle θr may be any angle that is unequal to that of the neutral axis N.

In some embodiments, such as those illustrated in FIGS. 14A-14C, the dimples 128 may be configured as one or more crevices having at least a pair of surfaces that form an apex. in various examples, the pair of surfaces may be of a generally equal length. Alternatively, the pair of surfaces may be of varied lengths. In addition, each of the surfaces may be oriented at a common angle, or a varied angle, relative to one another from the fluid axis FA of the one or more channels 38.

As discussed above, the one or more channels 38 may include a first crevice that is orientated along an upper surface of the one or more channels 38 and a second crevice that is orientated along a lower surface of the one or more channels 38. Similar to the discussion in regards to FIGS. 12A-12C, the first and second crevices may be aligned along the upper and lower surfaces (FIG. 14A) and/or staggered relative to one another along the upper and lower surfaces (FIG. 14B). Moreover, as illustrated in FIG. 14C, the distance between crevices along the surfaces of the one or more channels 38 may be generally consistent or varied there along. For example, as illustrated in FIG. 12C, a first crevice may be separated from an adjacent crevice by a first distance $d_1$, the second crevice may be separated from a third crevice by a second distance $d_2$, the third crevice may be separated from a fourth crevice by a third distance d3, and the fourth crevice may be separated from a fifth crevice by a fourth distance $d_4$. Each distance $d_1$, $d_2$, $d_3$, $d_4$ may be varied from the remaining distances $d_1$, $d_2$, $d_3$, $d_4$ or equal to one or more of the other distances $d_1$, $d_2$, $d_3$, $d_4$ while varied from the remaining distances $d_1$, $d_2$, $d_3$, $d_4$. Alternatively, in some embodiments, each of the distances $d_1$, $d_2$, $d_3$, $d_4$ may be generally equal to one another. In addition, the height of the crevices may be constant or varied along portions of the one or more channels 38.

With regards to FIGS. 15A-15C, in some embodiments, the dimples 128 may be configured as ridges that constrict the flow of the fluid through the one or more channels 38. For example, as illustrated in FIG. 15A, a first ridge may be defined in the upper surface of the one or more channels 38 while a second ridge is defined within a bottom surface of the one or more channels 38. As provided herein, the ridges may be aligned along the upper and lower surfaces (FIG. 15A) and/or staggered relative to one another along the upper and lower surfaces (FIG. 14B). Moreover, as illustrated in FIG. 15C, the distance between ridges along the surfaces of the one or more channels 38 may be generally consistent or varied there along. In addition, the height of the ridges may be constant or varied along portions of the one or more channels 38.

Figure 16:
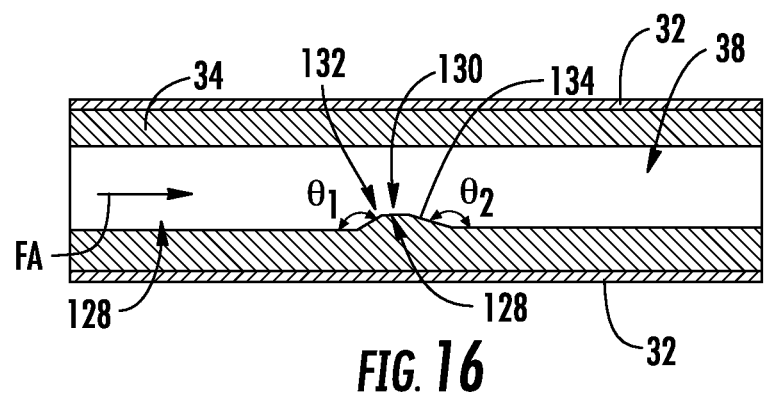
FIG. 16 is a cross-sectional view of a channel of the cooling plate taken along the line XII-XII of FIGS. 10 and 11 in accordance with various aspects of the present disclosure.

As illustrated in FIG. 16, in some embodiments, one or more of the ridges, or other types of dimples 128, may have an offset top surface 130 that may be generally parallel to the fluid axis FA of the one or more channels 38. For example, as illustrated, the ridge may include a first surface 132 that extends between an outer surface of the one or more channels 38 and the offset top surface 130. A second surface 134 may be positioned on an opposing side of the offset surface from the first surface 132 and operably couple the offset surface to the outer surface of the one or more channels 38. It will be appreciated that the offset surface is offset from other portions of the outer surfaces of the one or more channels 38. For example, the offset surface may be positioned inwardly or outwardly of the outer surface of the one or more channels 38.

In some embodiments, the offset surface may be generally parallel to the outer surface of the one or more channels 38 or non-parallel. Moreover, in some embodiments, a first ridge may include an offset surface that is parallel to the outer surface while a second ridge may include an offset surface that is non-parallel to the outer surface of the one or more channels 38. Further, it will be appreciated that any dimple 128 may include an offset surface without departing from the scope of the present disclosure.

Figure 17:
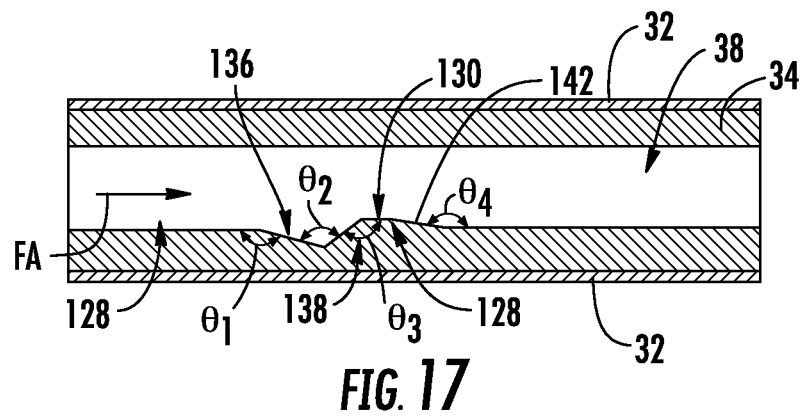
FIG. 17 is a cross-sectional view of a channel of the cooling plate taken along the line XII-XII of FIGS. 10 and 11 in accordance with various aspects of the present disclosure.

In some embodiments, more than one type of dimple 128 described herein may be defined by the one or more channels 38. For example, as illustrated in FIG. 17, in some embodiments, a crevice may be adjacently positioned to a ridge. As illustrated, the crevice defines a first surface 136 that extends outwardly and a second surface 138 that extends inward relative to a fluid axis FA of the one or more channels 38. The second surface 138 may intersect with a first surface 140 of the ridge and the second surface 142 may be positioned on an opposing side of an offset surface 130. In various embodiments, the first and second surfaces 136, 138 of the crevice and the first and second surfaces 140, 142 of the ridge may extend in any orientation without departing from the scope of the present disclosure. In some embodiments, the first surface 136 of the crevice may extend at a crevice submergence angle of $\theta_1$, the second surface 138 of the crevice may extend at a crevice inclination angle of $\theta_2$, the first surface 136 of the ridge may extend at a ridge inclination angle of $\theta_3$, and the second surface 138 of the ridge may extend at a ridge declination angle of $\theta_4$. In some instances, the absolute values of the crevice declination angle of $\theta_1$ and the ridge declination angle of $\theta_4$ may be generally equal to one another.

Further, it will be appreciated that although the exemplary electric machine 16 described with reference to the Figures above can be positioned within the turbine section of the engine, and other exemplary embodiments, the electric machine 16 may be positioned at any other suitable location within the turbine section of the engine, or ma ybe positioned elsewhere in the engine. For example, and others exemplary embodiments, the electric machine 16 may be embedded within a compressor section of the engine, may be embedded within a fan section of the engine, may be embedded elsewhere at a location inward of a core air flow path of the engine along the radial direction R, or may be positioned outward of the core air flow path of the engine along the radial direction R (e.g., within a casing, within an outer nacelle or ducting, etc.).

Further, still, it will be appreciated that although the exemplary electric machines 16 described herein are shown and described as being positioned within an aeronautical gas turbine engine, in other exemplary embodiments, the electric machine 16 may additionally or alternatively be utilized with any other suitable gas turbine engine, such as an aeroderivative gas turbine engine, a power generation gas turbine engine, etc. Further, still, in other exemplary embodiments, the electric machine 16 may be utilized with any other suitable engine (such as an internal combustion engine), or with any other suitable machine.

Figure 18:
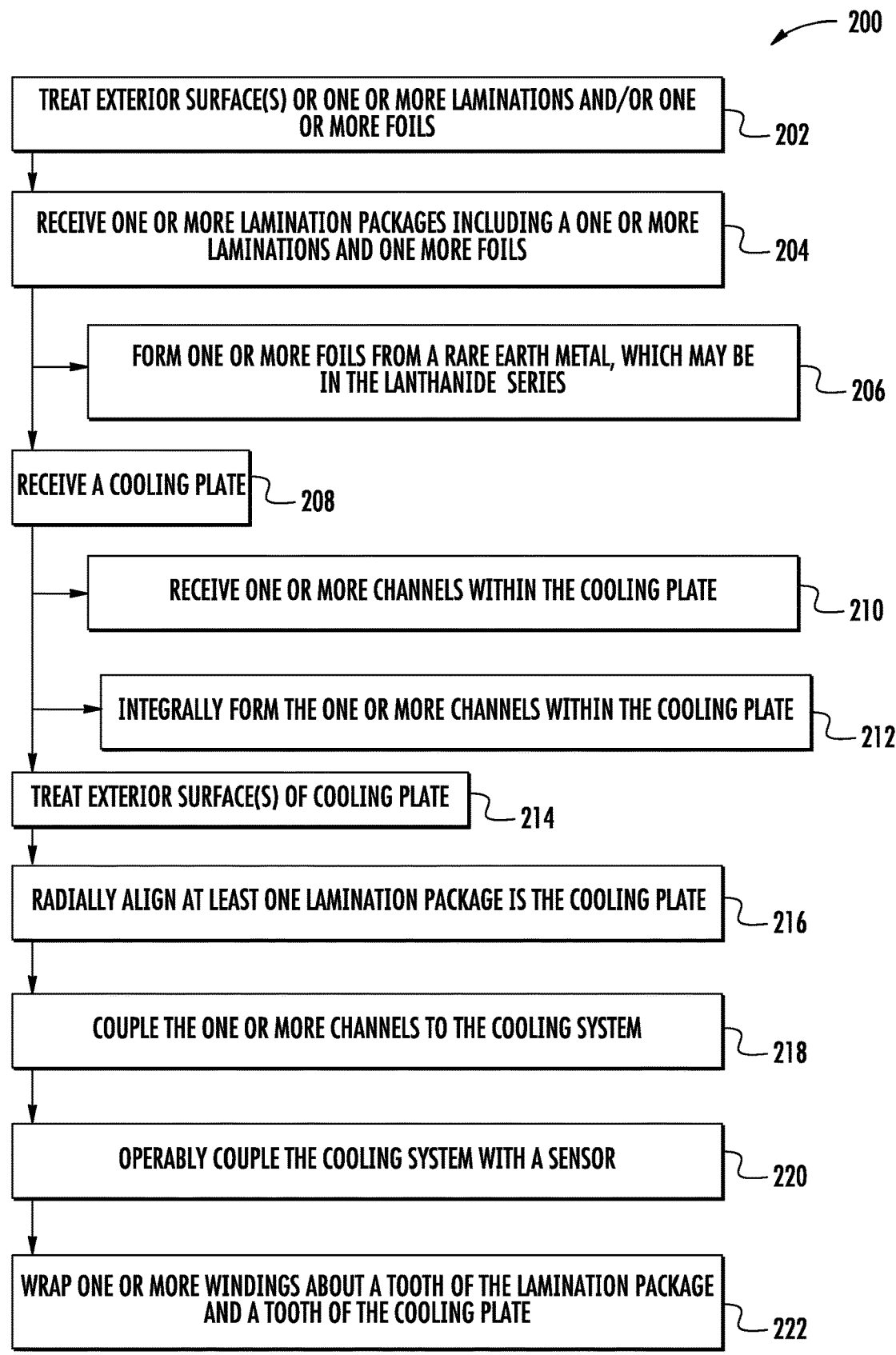
FIG. 18 is a flow diagram of a method of manufacturing an electric machine in accordance with various aspects of the present disclosure.

Referring now to FIG. 18, a flow diagram is provided of a method 200 for manufacturing an electric machine 16 in accordance with an exemplary aspect of the present disclosure. The electric machine 16 operated by the method 200 may be configured in accordance with one or more of the exemplary embodiments described hereinabove and depicted in FIGS. 1 through 17. As such, in at least certain exemplary aspects, an electric machine 16 operated by the method 200 may be incorporated into an engine, such as an aeronautical gas turbine engine, and may include a stator assembly 40 and a rotor 94.

For the exemplary method 200 depicted, the method 200 at (202) can include treating at least one surface of the one or more laminations and/or at least one surface of the one or more foils is treated with a coating thereon through a combination of subtractive machining and additive overcoating processes to reduce roughness and change contact resistance (thermal and/or electrical). In some embodiments, the exterior surfaces are treated to increase thermal contact conductance and decrease electrical contact conductance.

At (204), the method includes which may include forming the one or more lamination packages. Each lamination package 26 may include one or more laminations 28 and one or more foils 30 stacked on top of each other. In some embodiments, the receiving of the lamination packages 26 at (204) can include (206) forming one or more foils 30 from a rare earth metal, which may be in the lanthanide series. For instance, the foil 30 may be formed from or contain dysprosium.

At (208), the method can include receiving a cooling plate 34, which may be accomplished through forming the cooling plate 34 through an additive manufacturing process, a subtractive process, or any other practical process. In some embodiments, step (208) can include (210) forming one or more channels 38 within the cooling plate 34. In some examples, at (212) one or more channels 38 may be integrally formed with various portions of the cooling plate 34.

In addition, in various embodiments, the one or more channels 38 may include any number of dimples 128, as provided herein.

At (214), the method can include treating the cooling plate surfaces through a combination of subtractive machining and additive over-coating processes to reduce roughness and change contact resistance (thermal and/or electrical). In some embodiments, the exterior surfaces are treated to increase thermal contact conductance and decrease electrical contact conductance.

Next, at (216), at least one lamination package 26 is aligned with the cooling plate 34. In various examples, the lamination package 26 and the cooling plate 34 may be held in a position relative to each through any practicable retaining strategy such that they are aligned along a common axis.

At (218), the method may include coupling the one or more channels 38 to a cooling system 36. The cooling system 36 may be configured to regulate a fluid through the one or more channels 38 at cryogenic temperature ranges. Further, in some instances, at (220), the cooling system 36 may be operably coupled with a sensor, such as a thermometer. In some embodiments, the sensor is configured to detect a temperature of the electric machine 16, and a computing system 72 actuates the fluid movement assembly 56 when the electric machine 16 exceeds a predefined threshold temperature. Additionally, and/or alternatively, the cooling system 36 may be actuated each time the electric machine 16 is in use.

At (222), one or more windings 90 are wrapped about a tooth of the lamination package 26 and a tooth of the cooling plate 34. As provided herein, in some examples, the electric machine 16 may be implemented on a vehicle that is capable of traveling at speeds reaching or exceeding the transonic region. While traveling at speeds exceeding 250 meters per second, the electric machine 16 may generate excessive heat. Some of the generated heat may be rejected by the fluid within the one or more channels 38 and the cooling system 36. In addition, in some embodiments, in which the foil 30 within the lamination package 26 includes dysprosium, the power density of the electric machine 16 may be increased by maintaining the dysprosium at temperatures below and/or proximate to cryogenic temperature ranges.

It will be appreciated that operating an electric machine in accordance with one or more of the exemplary aspects of the present disclosure may allow for a more flexible control functionality, allowing for a single electric machine to effectively control multiple rotating shafts/components of an engine, relative to one another.

Further aspects of the present disclosure may be provided in the following clauses:

An electric machine comprising: a stator assembly, the stator assembly comprising: a stator core including one or more lamination packages, the stator core defining an outer ring and a plurality of teeth extending from the outer ring; a cooling plate positioned adjacent to at least one of the plurality of lamination packages, wherein the cooling plate defines one or more channels therethrough; one or more windings arranged around one or more teeth of the stator core; a rotor operably coupled with the stator assembly; and a cooling system fluidly coupled with the one or more channels of the cooling plate, wherein the cooling system provides a cryogenic fluid through the one or more channels.

The electric machine of one or more of these clauses, wherein the one or more lamination packages includes at least one lamination and at least one foil, and wherein the foil is at least partially formed from a rare earth metal in the lanthanide series.

The electric machine of one or more of these clauses, wherein the foil is at least partially formed from dysprosium, and wherein the cooling system is configured to cool the dysprosium to a temperature of negative 150 degrees Celsius (° C.) or less.

The electric machine of one or more of these clauses, wherein the cooling plate of the stator assembly is formed through an additive manufacturing process, and wherein the exterior surfaces are treated to increase thermal contact conductance and decrease electrical contact conductance.

The electric machine of one or more of these clauses, wherein the electrical machine is incorporated into an aeronautical engine or an aeroderivative engine.

The electric machine of one or more of these clauses, wherein the engine is configured as a scramjet that is configured to propel an aircraft at speeds in excess of Mach 0.8.

The electric machine of one or more of these clauses, wherein the one or more channels defines at least one dimple.

The electric machine of one or more of these clauses, wherein the at least one dimple is configured as a first dimple extending from a first portion of at least one of the one or more channels and a second dimple extending from a second portion of the at least one of the one or more channels on an opposing side of a fluid axis from the first dimple.

The electric machine of one or more of these clauses, wherein the at least one dimple is configured to increase or decrease a cross-sectional volume of at least one of the one or more channels.

The electric machine of one or more of these clauses, wherein the at least one of the one or more channels defines a first channel and a second channel, and wherein a flow rate of the first channel is altered relative to the second channel.

The electric machine of one or more of these clauses, wherein at least a portion of one of the one or more channels defines a cross-section with an offset orientation angle.

The electric machine of one or more of these clauses, wherein the at least one dimple includes first, second and third dimples, and wherein a distance between the first dimple and the second dimple is varied from a distance between the second dimple and the third dimple.

The electric machine of one or more of these clauses, wherein the one or more lamination packages includes one or more laminations and one or more foils, and wherein at least one surface of the one or more laminations or at least one surface of the one or more foils is treated with a coating thereon.

An electric machine for an engine, the electric machine comprising: a stator assembly, the stator assembly comprising: a stator core including one or more lamination packages, one or more teeth, and an externally-overcoated cooling plate defining one or more internal cooling flow channels, wherein each lamination package includes at least one lamination and at least one foil, wherein the cooling plate separates a first lamination package and a second lamination package of the one or more lamination packages; one or more windings arranged around the one or more teeth of the stator core; a rotor operably coupled with the stator assembly; and a cooling system fluidly coupled with the one or more channels of the cooling plate and providing a fluid along a flow axis of the one or more channels, wherein the one or more channels defines at least one dimple extending outwardly from the fluid flow axis.

The electric machine of one or more of these clauses, wherein the cooling system provides a cryogenic fluid through the one or more channels.

A method of manufacturing an electric machine for an engine, the electric machine comprising a rotor, a stator assembly, and a cooling system, the method comprising: receiving a lamination package that includes at least one lamination and at least one foil, the foil at least partially containing dysprosium; receiving an externally-overcoated cooling plate having one or more internal cooling flow channels; aligning the lamination package and the cooling plate along a common axis; and fluidly coupling a cooling system to the one or more channels of the cooling plate.

The method of one or more of these clauses, wherein the cooling plate and the lamination package each define at least one tooth and the at least one tooth of the cooling plate and the at least one tooth of the lamination package are aligned.

The method of one or more of these clauses, further comprising: operably coupling a sensor with the cooling system.

The method of one or more of these clauses, wherein the sensor is configured to detect a temperature of the electric machine, and a computing system actuates a compressor when the electric machine exceeds a predefined threshold temperature.

The method of one or more of these clauses, further comprising: wrapping one or more windings about a tooth of the lamination package and a tooth of the cooling plate.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An electric machine comprising:
    a stator assembly, the stator assembly comprising:
        a stator core including one or more lamination packages, the stator core defining an outer ring and a plurality of teeth extending from the outer ring;
        a cooling plate positioned adjacent to at least one of the plurality of lamination packages, wherein the cooling plate defines one or more channels therethrough, wherein the one or more channels includes a plurality of tributaries extending within one or more teeth of the plurality of teeth, wherein the plurality of tributaries is in fluid communication with the one or more channels, wherein the cooling plate is formed through an additive manufacturing process, wherein one or more exterior surfaces of the cooling plate are treated to increase thermal contact conductance and decrease electrical contact conductance; and
        one or more windings arranged around one or more teeth of the stator core;
    a rotor operably coupled with the stator assembly; and
    a cooling system fluidly coupled with the one or more channels of the cooling plate, wherein the cooling system provides a cryogenic fluid through the one or more channels.

2. The electric machine of claim 1, wherein the one or more lamination packages includes at least one lamination and at least one foil, and wherein the foil is at least partially formed from a rare earth metal in the lanthanide series.

3. The electric machine of claim 2, wherein the foil is at least partially formed from dysprosium, and wherein the cooling system is configured to cool the dysprosium to a temperature of negative 150 degrees Celsius (° C.) or less.

4. The electric machine of claim 1, wherein the stator assembly is incorporated into an aeronautical engine or an aeroderivative engine.

5. The electric machine of claim 4, wherein the electric machine is configured as a scramjet that is configured to propel an aircraft at speeds in excess of Mach 0.8.

6. The electric machine of claim 1, wherein the one or more channels defines at least one dimple.

7. The electric machine of claim 6, wherein the at least one dimple is configured as a first dimple extending from a first portion of at least one of the one or more channels and a second dimple extending from a second portion of the at least one of the one or more channels on an opposing side of a fluid axis from the first dimple.

8. The electric machine of claim 6, wherein the at least one dimple is configured to increase or decrease a cross-sectional volume of at least one of the one or more channels.

9. The electric machine of claim 1, wherein the at least one of the one or more channels defines a first channel and a second channel, and wherein a flow rate of the first channel is altered relative to the second channel.

10. The electric machine of claim 1, wherein at least a portion of one of the one or more channels defines a cross-section with an offset orientation angle.

11. The electric machine of claim 6, wherein the at least one dimple includes a first dimple, a second dimple, and a third dimple, and wherein a distance between the first dimple and the second dimple is varied from a distance between the second dimple and the third dimple.

12. The electric machine of claim 1, wherein the one or more lamination packages includes one or more laminations and one or more foils, and wherein at least one surface of the one or more laminations or at least one surface of the one or more foils is treated with a coating thereon.

13. An electric machine for an engine, the electric machine comprising:
    a stator assembly, the stator assembly comprising:
        a stator core including one or more lamination packages, one or more teeth, and an externally-overcoated cooling plate defining one or more internal cooling flow channels, wherein the one or more channels includes a plurality of tributaries extending within one or more teeth of the plurality of teeth, wherein the plurality of tributaries is in fluid communication with the one or more channels, wherein each lamination package includes at least one lamination and at least one foil, wherein the cooling plate separates a first lamination package and a second lamination package of the one or more lamination packages; and
        one or more windings arranged around the one or more teeth of the stator core;
    a rotor operably coupled with the stator assembly; and
    a cooling system fluidly coupled with the one or more channels of the cooling plate and providing a fluid along a flow axis of the one or more channels, wherein the one or more channels defines at least one dimple extending outwardly from the flow axis.

14. The electric machine of claim 13, wherein the cooling system provides a cryogenic fluid through the one or more channels.

15. A method of manufacturing an electric machine for an engine, the electric machine comprising a rotor, a stator assembly, and a cooling system, the method comprising:
- receiving a lamination package that includes at least one lamination and at least one foil, the foil at least partially containing dysprosium;
- receiving an externally-overcoated cooling plate having one or more internal cooling
- flow channels, wherein the one or more cooling flow channels includes a plurality of tributaries extending within one or more teeth of a plurality of teeth defined by the stator assembly;
- aligning the lamination package and the cooling plate along a common axis; and
- fluidly coupling the cooling system to the one or more channels of the cooling plate.

16. The method of claim 15, wherein the cooling plate and the lamination package each define at least one tooth and the at least one tooth of the cooling plate and the at least one tooth of the lamination package are aligned.

17. The method of claim 15, further comprising:
operably coupling a sensor with the cooling system.

18. The method of claim 17, wherein the sensor is configured to detect a temperature of the electric machine, and a computing system actuates a compressor when the electric machine exceeds a predefined threshold temperature.

19. The method of claim 15, further comprising:
wrapping one or more windings about a tooth of the lamination package and a tooth of the cooling plate.

\* \* \* \* \*